United States Patent
Baldemair et al.

(10) Patent No.: US 11,032,837 B2
(45) Date of Patent: Jun. 8, 2021

(54) WIRELESS DEVICE AND A NETWORK NODE FOR A WIRELESS COMMUNICATION SYSTEM

(71) Applicant: Telefonaktiebolaget LM Ericsson (publ), Stockholm (SE)

(72) Inventors: Robert Baldemair, Solna (SE); Andreas Cedergren, Bjärred (SE); Erik Dahlman, Stockholm (SE); Sorour Falahati, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/766,984

(22) PCT Filed: Dec. 20, 2017

(86) PCT No.: PCT/SE2017/051304
§ 371 (c)(1),
(2) Date: Apr. 9, 2018

(87) PCT Pub. No.: WO2018/128574
PCT Pub. Date: Jul. 12, 2018

(65) Prior Publication Data
US 2020/0077424 A1 Mar. 5, 2020

Related U.S. Application Data

(60) Provisional application No. 62/442,533, filed on Jan. 5, 2017.

(51) Int. Cl.
*H04W 72/12* (2009.01)
*H04W 72/04* (2009.01)

(52) U.S. Cl.
CPC ... *H04W 72/1268* (2013.01); *H04W 72/0453* (2013.01)

(58) Field of Classification Search
None
See application file for complete search history.

(56) References Cited

U.S. PATENT DOCUMENTS

2011/0135016 A1 6/2011 Ahn et al.
2014/0036803 A1 2/2014 Park
(Continued)

FOREIGN PATENT DOCUMENTS

CN 101984569 A 3/2011
CN 102013938 A 4/2011
(Continued)

OTHER PUBLICATIONS

3GPP , "3GPP TS 36.211 V14.1.0 (Dec. 2016)", 3rd Generation Partnership Project; Technical Specification Group Radio Access Network; Evolved Universal Terrestrial Radio Access (E-UTRA); Physical channels and modulation (Release 14), Dec. 2016, pp. 1-175.
(Continued)

*Primary Examiner* — Anh Vu H Ly
(74) *Attorney, Agent, or Firm* — Christopher & Weisberg, P.A.

(57) ABSTRACT

The disclosure relates to a method for use in a wireless device in a wireless communication system for transmitting uplink control information, UCI, the method comprising obtaining UCI comprising a number of UCI bits, mapping the UCI bits to a set of modulation symbols, obtaining a resource configuration, wherein the resource configuration is at least indicative of one or more allocated resources available for transmission of the modulation symbols, mapping the modulation symbols to the resource configuration,
(Continued)

wherein the resource configuration is further indicative of allocated subcarriers comprised in the one or more allocated resources, and transmitting the modulation symbols using the allocated subcarriers.

12 Claims, 15 Drawing Sheets

(56) References Cited

U.S. PATENT DOCUMENTS

| | | | |
|---|---|---|---|
| 2015/0326358 A1 | 11/2015 | Baldemair et al. | |
| 2016/0374090 A1 | 12/2016 | Kim et al. | |
| 2017/0332369 A1* | 11/2017 | Hosseini | H04L 5/0051 370/328 |
| 2017/0366380 A1* | 12/2017 | Hwang | H04L 5/0055 370/328 |
| 2018/0110041 A1* | 4/2018 | Bendlin | H04L 5/0007 370/328 |
| 2018/0123654 A1* | 5/2018 | Park | H04B 7/0626 |
| 2019/0007248 A1* | 1/2019 | Takeda | H04W 72/12 |
| 2019/0238382 A1* | 8/2019 | Baldemair | H04L 27/2636 |
| 2019/0260454 A1* | 8/2019 | Lindbom | H04L 5/10 |
| 2019/0305918 A1* | 10/2019 | Siomina | H04W 76/36 |
| 2019/0372641 A1* | 12/2019 | Muruganathan | H04B 7/0617 |
| 2019/0373597 A1* | 12/2019 | Bendlin | H04W 72/044 370/328 |

FOREIGN PATENT DOCUMENTS

| | | |
|---|---|---|
| CN | 102315897 A | 1/2012 |
| CN | 102412880 A | 4/2012 |
| CN | 102870367 A | 1/2013 |
| CN | 104429008 A | 3/2015 |
| CN | 106257856 A | 12/2016 |
| EP | 2469784 A2 | 6/2012 |
| KR | 20090020866 A | 2/2009 |
| RU | 2554550 C2 | 6/2015 |
| TW | 201129011 A | 8/2011 |
| WO | 2010137341 A1 | 12/2010 |
| WO | 2011132849 A2 | 10/2011 |
| WO | 2016123372 A1 | 8/2016 |
| WO | 2016163855 A1 | 10/2016 |
| WO | 2017019132 A1 | 2/2017 |
| WO | 2017196457 A1 | 11/2017 |

OTHER PUBLICATIONS

Unknown, Author , "Discussion on UCI transmission in NR", Motorola Mobility, 3GPP TSG RAN WG1 Meeting #87, R1-1612747, Reno, Nevada, USA, Nov. 14-18, 2016, 1-4.

Unknown, Author , "On Long PUCCH", Ericsson, TSG-RAN WG1 NR ad-hoc, R1-1701124, Spokane, USA, Jan. 16-20, 2018, 1-3.

Unknown, Author , "On long PUCCH for medium to large payload sizes", Ericsson, TSG-RAN WG1 NR ad-hoc, R1-1701183, Spokane, USA, Jan. 16-20, 2017, 1-7.

Unknown, Author , "On the Design of Long PUCCH far Medium to Large Payiaads", Ericsson, 3GPP TSG RAN WG1 Meeting #88bis, R1-1706039, Spokane, US, Apr. 3-7, 2018, 1-14.

Unknown, Author, "Design aspects of sPUCCH", 3GPP TSG-RAN WG1 #86, R1-167493, GOteborg, Sweden, Aug. 22-26, 2016, 1-5.

Unknown, Author, "Design of long duration UL control channel for NR", 3GPP TSG RAN WG1 Meeting #87, R1-1611844, Reno, USA, Nov. 14-18, 2016, 1-4.

Unknown, Author, "Design of one-symbol UL control channel for NR", 3GPP TSG RAN WG1 Meeting #87, R1-1611842, Reno, USA, Nov. 14-18, 2016, 1-4.

Unknown, Author, "On the PUCCH structure for NR", 3GPP TSG-RAN WG1 #87, R1-1612238, Reno, USA, Nov. 14-18, 2016, 1-7.

Unknown, Author, "Overall structure of UL control channel for NR", 3GPP TSG RAN WG1 Meeting #87, R1-1611840, Reno, USA, Nov. 14-18, 2016, 1-6.

Unknown, Author, "UCI multiplexing in the presence of UL data", 3GPP TSG-RAN WG1 #87, R1-1612239, Reno, USA, Nov. 14-18, 2016, 1-3.

Jayalakshimi, M., "UCI Transmission via PUCCH in LTE Uplink", Feb. 25, 2015, 1-13.

Unknown, Author, "Summary of e-mail discussions on uplink control signaling", TSG-RAN WG1 #87, R1-1613162, Reno, NV, USA, Nov. 14-18, 2016, 1-24.

EPO Communication dated Apr. 8, 2021 for International Application No. 17890305.0, consisting of 8-pages.

TSG-RAN WG1 #87 R1-1612916; Title: Summary of e-mail discussions on uplink control signaling; Source: Ericsson; Agenda Item: 7.1.4.2; Document for: Discussion and Decision; Date and Location: Nov. 14-18, 2016, Reno, NV, USA, consisting of 22-pages.

* cited by examiner

WIRELESS DEVICE AND A NETWORK NODE FOR A WIRELESS COMMUNICATION SYSTEM

TECHNICAL FIELD

The present disclosure relates to a wireless device and a network node for a wireless communication system. Furthermore, the present disclosure also relates to a corresponding, methods, computer programs and computer program products.

BACKGROUND

In wireless communication networks, information is transmitted wirelessly between the different wireless devices of the system. For example, information may be transmitted downlink, (DL) from a network node such as a base station (BS) to a user equipment (UE) or wireless device, or uplink (UL) from the UE or wireless device to the network node or BS. The information may be both data and control information, and different channels may be used for transmitting the information depending on whether the transmission is uplink or downlink, and whether the information contains data or control information. In the radio access technology (RAT) Long Term Evolution (LTE) for example uplink control information (UCI) is often carried by the physical uplink control channel (PUCCH), but can also be transported using the physical uplink shared channel (PUCCH) if the UE has any application data or radio resource control (RRC) signaling. The PUCCH control signaling channel in LTE comprises Hybrid automatic repeat request (HARQ) positive/negative acknowledgement (ACK/NACK), Channel Quality Information CQI-channel quality indicators, multiple input multiple output (MIMO) feedback—RI (Rank Indicator), PMI (Preceding Matrix Indicator), scheduling requests for uplink transmission and Binary Phase Shift Keying (BPSK) or Quadrature Phase Shift Keying (QPSK) used for PUCCH modulation. The fifth generation of mobile telecommunications and wireless technology is not yet fully defined but in an advanced draft stage within 3GPP. 5G wireless access will be realized by the evolution of LTE, for existing spectrum, in combination with new radio access technologies that primarily target new spectrum. Thus it includes work on an 5G New Radio (NR) Access Technology, also known as 5G or next generation (NX). The NR air interface targets spectrum in the range from sub-1 GHz up to 100 GHz with initial deployments expected in frequency bands not utilized by LTE. The work on the new NR RAT is ongoing, and the channels and channel formats for transmitting information are now being developed.

There is often a need in such wireless communication networks to transmit information, e.g., uplink control information, UCI, comprising a number of UCI bits. The UCI may originate from one or more physical uplink control channels, PUCCH, e.g. from a single UE or multiplexed from multiple UE:s. The UCI must then be mapped to symbols to be transmitted, using allocated time or frequency resources, to other wireless devices, e.g. Orthogonal frequency-division multiplexing OFDM symbols or Discrete Fourier Transform, DFT, Spreading, DFTS, Orthogonal Frequency Division Multiplexing —OFDM symbols, DTTS-OFDM.

Conventional systems, such as LTE, maps UCI to symbols by defining a multitude of predefined PUCCH formats. The different predefined PUCCH formats, covers a large range of payloads with sometimes rather similar payload sizes. This is sub-optimal when trying to reduce the number of PUCCH formats, which is preferred for NR.

Multiple LTE PUCCH formats rely on block-spreading across OFDM symbols to multiplex users. The number of OFDM symbols across which block spreading can be applied depends on the number of available OFDM symbols A problem when applying such predefined LTE formats to 3GPP new radio, NR, is that the number of available or allocated time symbols e.g. OFDM symbols can vary. In one example, NR defines slots of 7 and 14 symbols, slots with DL control region or without, slots with extended guard times between duplex directions, numerologies with extended cyclic prefix. To apply the conventional LTE solution and block-spreading PUCCHs across symbols to multiplex users in NR would require that one specific format is defined for each available or allocated number of OFDM symbols. This would increase the complexity and number of PUCCH formats substantially.

A further problem is that information of multiple PUCCHs associated to different users may need to be multiplexed or combined together before transmission to another wireless device, e.g. in the form of UCI. LTE solves this by defining PUCCH formats that are relying on block-spreading across symbols. The number of OFDM symbols across which the PUCCH formats specify that block-spreading can be applied depends on the number of available or allocated OFDM symbols. The number of available or allocated OFDM symbols are mapped to allocated resources, such as physical resource blocks, PRBs. This solution has the disadvantage that the number of allocated physical resource blocks, PRBs, must be fixed for a particular PUCCH format.

LTE also define PUCCH formats that are not relying on block-spreading across symbols, e.g. PUCCH Format 2/2a/2b, 4, 5. PUCCH Format 2/2a/2b and 5 have the problem that they offer too small payloads for NR, i.e. too few offered payload bits required for NR. The payload sizes (offered number of payload bits) of LTE PUCCH Format 4 is larger. The format 4 has the problem that it is still not flexible enough to support NR, which needs to cater for a larger range from a small number of payload bits to a large number of payload bits. In addition it needs, e.g. in the case of small payloads for each PUCCH or associated user, to support multiplexing of users onto the same time-frequency resource, such as a physical resource block, PRB. In one example, PUCCH Format 5 in LTE enables multiplexing of PUCCHs associated to two users using block-spreading per DFTS-OFDM symbol. However, PUCCH format 5 has a fixed bandwidth of one PRB, and thus does not support a varying number of PUCCHs.

Thus there is a need to provide a solution which mitigates or solves the described drawbacks and problems, such as applying legacy LTE PUCCH formats to NR.

SUMMARY

An objective of embodiments of the invention is to provide a solution which mitigates or solves the drawbacks and problems described above. The above and further objectives are achieved by the subject matter described herein. Further advantageous embodiments or implementation forms of the invention are also defined herein.

According to a first aspect of the invention, the above mentioned and other objectives are achieved with a method for use in a wireless device in a wireless communication system for transmitting uplink control information, UCI, the method comprising obtaining UCI comprising a number of UCI bits, mapping the UCI bits to a set of modulation symbols, obtaining a resource configuration, wherein the resource configuration is at least indicative of one or more allocated resources available for transmission of the modulation symbols, mapping the modulation symbols to the resource configuration, wherein the resource configuration is further indicative of allocated subcarriers comprised in the one or more allocated resources, and transmitting the modulation symbols using the allocated subcarriers.

At least one advantage of the present invention is that complexity and number of PUCCH formats can be substantially reduced.

Further applications and advantages of embodiments of the invention will be apparent from the following detailed description. A more complete understanding of embodiments of the invention will be afforded to those skilled in the art, as well as a realization of additional advantages thereof, by a consideration of the following detailed description of one or more embodiments.

BRIEF DESCRIPTION OF THE DRAWINGS

It should be appreciated that like reference numerals are used to identify like elements illustrated in one or more of the figures.

DETAILED DESCRIPTION

Figure 1:
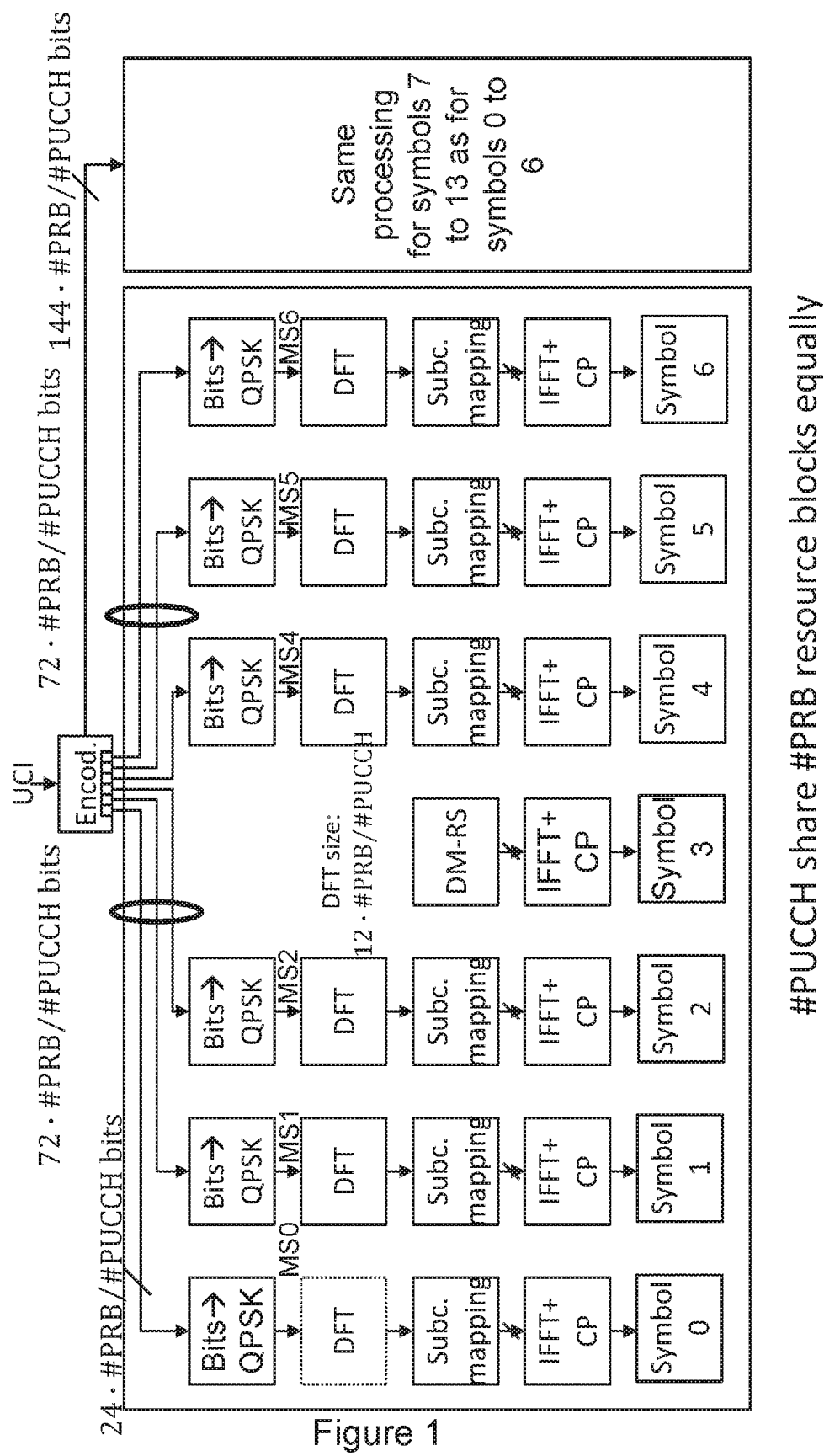
FIG. 1 shows a block diagram of a wireless device according to one or more embodiments of the present disclosure.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

Due to the flexible frame structure of NR the time duration of an uplink, UL, transmission in an UL slot can vary. In one example NR has different slot lengths, UL heavy or UL only slots extended cyclic prefix. As previously discussed, not considering the flexible frame structure may lead to a large number of PUCCH formats since one specific format for each number of available OFDM symbols is required.

In this disclosure, the term "resources" is used interchangeably with physical resources, and signifies resources available for transmitting information wirelessly such as code, time and/or frequency resources. An example of physical resources may be physical resource blocks, PRBs.

In this disclosure the term wireless device is used interchangeably with wireless node. The expression "modulation symbol" may be used to indicate a combination of phase and magnitude within a symbol map or signal constellation. The expression symbol or time-symbol may be used to indicate a modulation symbol mapped onto physical resources, such as code, time and/or frequency resources.

LTE defines a multitude of PUCCH formats with sometimes rather similar payload sizes. It is preferable to reduce the number of PUCCH formats in NR.

Multiple LTE PUCCH formats rely on block-spreading across OFDM symbols to multiplex users. The number of OFDM symbols across which block-spreading can be applied depends on the number of available OFDM symbols. In NR the number of available OFDM symbol can vary: NR defines examples of slots having 7 and 14 symbols, slots with DL control region or without, slots with extended guard times between duplex directions, numerologies with extended cyclic prefix. Relying on block-spreading across symbols would require one specific format for each number of available OFDM symbols which would increase the number of PUCCH formats substantially.

The LTE PUCCH format not relying on block-spreading across time symbols are PUCCH Format 2/2a/2b, 4, 5. PUCCH Format 2/2a/2b and 5 provides too small payloads for NR. Payload sizes of PUCCH Format 4 is larger but is not flexible enough to cater from small payloads to large payloads and multiplexing of users onto the same time-frequency resource.

The present disclosure provides a PUCCH format that provides for medium to large payload sizes. Multiple users can be multiplexed onto the same time-frequency resource by providing multiplexing within an OFDM symbol rather than relying on block-spreading across OFDM symbols. This makes this format independent of OFDM symbols available for PUCCH. Different payload sizes are accommodated by varying the number of allocated PRBs and/or modulation order.

The present disclosure with proposed PUCCH schemes covers a wide range of payloads and also enables multiplexing of users onto the same time-frequency resource. This format together with another format for small payload sizes can cover all required UCI payload sizes of NR resulting in much fewer PUCCH formats than in LTE.

In other words, an advantage of the present disclosure is to provide for a wide range of payloads. A further advantage is that the number of PUCCH formats can be reduced. A further advantage of the present invention is that multiplexing of multiple users onto the same time-frequency resource is enabled for a wide range of payloads.

The present disclosure proposes to design long PUCCH agnostic with regards to the number of UL symbols, in particular for medium to large payload sizes or number of payload bits. The present disclosure further proposes that multiplexing or combining information from multiple PUCCHs or users should rely on multiplexing or combining per symbol, in contrary to conventional LTE solutions that rely on block-spreading across OFDM symbols for multiplexing. The present disclosure has the advantage that it makes the PUCCH format independent of the number of OFDM symbols available for PUCCH. Different payload sizes are accommodated, e.g. by varying the number of allocated PRB or modulation order.

In 3GPP it was discussed, see e.g. "RAN1 Chairman's Notes", 3GPP TSG RAN WG1 Meeting #87, November 2016, that long Physical Uplink Control Channel, PUCCH, should be based on a low Peak to Average Power Ratio, low-PAPR, design. Furthermore, 3GPP agreed in its simulation assumptions for control channel coding scheme on payload sizes or number of payload bits up to 200 bits, see "RAN1 Chairman's Notes", 3GPP TSG RAN WG1 Meeting #86, August 2016. Such large payload sizes cannot be supported with sequence modulation. The present disclosure proposes that long PUCCH may be based on OFDM or DFTS-OFDM modulation. To cope with varying payload sizes from a few 10 bits to a few hundred bits it is necessary to support different bandwidths for long PUCCH. In one example, PUCCH Format 5 in LTE enables multiplexing of two users using block-spreading per DFTS-OFDM symbol which avoids dependencies across DFT-spread symbols. However, PUCCH format 5 has a fixed bandwidth of one PRB. To unify bandwidth flexibility and multiplexing capability in a clean way the present disclosure proposes that PUCCH multiplexing may be based on frequency division multiplexing, FDM: In one example, multiple PUCCHs sharing the same PRBs may use a fraction of the PRB subcarriers contiguously 220 or in a comb fashion 210. Each of the multiple PUCCHs allocated to the same PRBs may be assigned different combs. Combs or comb patterns 210 are further described in relation to FIG. 2.

LTE defines a multitude of different PUCCH formats, covering a large range of payloads. Examples of the multitude of different PUCCH formats defined by LTE are given below.

PUCCH Format 1/1a/1b is used for scheduling request and one or two-bit HARQ feedback. This format uses sequence modulation where a low-PAPR base sequence is mapped onto 12 subcarriers of one OFDM symbol and time-domain block-spreading. Different users can be multiplexed onto the same time-frequency resource by assigning different users different cyclic shifts of the same base-sequence and/or assigning different block-spreading sequences. The allocated 12 subcarriers frequency-hop at slot boundary to obtain frequency-diversity. Three out of seven symbols are used for reference signals, e.g. normal cyclic prefixes.

PUCCH Format 2/2a/2b is used for CQI up to 13 bits and also for CQI together with HARQ feedback. The payload is encoded using Reed Muller coding and pairs of bits are mapped to QPSK symbols. Each QPSK symbol is multiplied with a low-PAPR base sequence which is mapped onto 12 subcarriers of one OFDM symbol. Different coded bits are transmitted using different OFDM symbols and the allocated 12 subcarriers frequency-hop at slot boundary to obtain frequency-diversity. In total 20 coded bits are mapped across 20 OFDM symbols.

Format 2a/2b which carry in addition to CQI also HARQ feedback modulates the second reference signal with one- or two-bit HARQ feedback. Multiple users can be multiplexed onto the same time-frequency resource by assigning different users different cyclic shifts of the same base-sequence. Two out of seven symbols are used for reference signals, e.g. normal cyclic prefixes.

PUCCH Format 3 is used for payloads up to 11 or 22 bits. The payload is encoded using Reed Muller coding, e.g. up to 11 bits: single Reed Muller code, up to 22 bits: dual Reed Muller code. In both cases, 48 coded bits are generated. In case of single Reed Muller code the bits are repeated. The 48 coded bits are mapped to 24 QPSK symbols. 12 QPSK symbols are transmitted on 12 subcarriers in the first slot and the other 12 QPSK symbols on other 12 subcarriers in the second slot. Each slot may be frequency-hopped to obtain frequency-diversity. The 12 QPSK symbols are transform, e.g. DFT, precoded to obtain low PAPR and transmitted on 12 subcarriers, and repeated, e.g. with block-spreading, across OFDM symbols. Multiple users can be multiplexed onto the same time-frequency resource by assigning different users different block-spreading sequences. Two out of seven symbols are used for reference signals, e.g. normal cyclic prefixes.

PUCCH Format 4 is used for payloads up to 768 bits, assuming 8 allocated PRBs and code rate 1/3. The payload is encoded using tail-biting convolution codes and mapped to QPSK modulation symbols. The modulation symbols are portioned into groups and each group is DFT-precoded and transmitted in a separate OFDM symbol. The allocated number of PRB can be adjusted to the payload size. The allocated PRBs may frequency-hop at the slot boundary to obtain frequency-diversity. Per slot one Demodulation Reference Signal, DM-RS, symbol is inserted, i.e. one out of seven symbols is used for reference signal (normal cyclic prefix). This format does not support multiplexing of different users onto the same resource.

PUCCH Format 5 is very similar to PUCCH Format 4 and supports payload sizes up to 48 bits, with code rate 1/3. The difference from PUCCH Format 4 is that this format only supports a fixed PRB allocation of one PRB and allows multiplexing of two users onto the same time-frequency resource. This multiplexing is achieved by block-spreading six QPSK symbols with a length-two sequence, which results in 12 modulation symbols. The modulation symbols are then input to the DFT precoder.

NR defines different slot formats, a slot can be 7 or 14 symbols, a slot duration can be a pure UL slot or it can have a DL control region, a slot duration can accommodate differently long guard periods between duplex directions, or multiple slots can be aggregated, numerologies with extended cyclic prefix result in fewer symbols per slot. All these factors impact the number of OFDM symbols that are available for PUCCH transmission. To avoid defining PUCCH formats for each length the proposed design does not use block-spreading across OFDM symbols to multiplex users.

It is also preferable to have a single PUCCH format which payload size covers a large range. To enable the proposed scheme can use different QAM modulation orders (even though preferred is a single modulation order, QPSK) or more assigned resources in frequency-domain (PRB).

In other words, the number of time symbols, such as OFDM or DFTS-OFDM symbols, available for PUCCH transmission varies. The present disclosure avoids defining PUCCH formats for each number of available time symbols by using varying encoding codes/encoding rate, modulation order, number of frequency resources (such as subcarriers in allocated PRBs and allocated PRBs) and spreading sequences.

FIG. 1 shows a block diagram of a wireless device according to an embodiment of the present disclosure. FIG. 1 shows a preferred embodiment where PUCCH based on DFTS-OFDM and Frequency Division Multiplex, FDM, of multiple PUCCH. A block diagram of this preferred embodiment is shown in FIG. 1.

The UCI is encoded in an optional step, e.g. with Polar codes, Reed Muller or other block codes, convolutional codes, LDPC codes, Turbo codes. The coded bits are then optionally portioned or split into sets, one set for each OFDM symbol. Encoding can here also include scrambling, interleaving, and Cyclic Redundancy Check CRC attachment if needed.

As shown in the block diagram of FIG. 1, the PUCCH is based on DFTS-OFDM and FDM. It is assumed that QPSK modulation is used, that a number #PRB PRBs are allocated as allocated resources to transmit PUCCH, and that a number #PUCCH PUCCHs can be multiplexed.

In some embodiments the encoding can contain a repetition step, which means that (partly) the same coded bits are transmitted in or using multiple symbols, e.g. symbols 0-6 in FIG. 1. For example, the coded bit sequence for symbols 7 to 13 of a slot could be the same as for symbols 0 to 6; even though the preferred solution is to rely on coding instead of repetition between first and second part within a slot. Another example is PUCCH across multiple slots, here the same repeated and coded bits could be transmitted in multiple slots. One way to adjust payload size is then to adjust code rate.

In one example, a set of coded bits that is mapped to a modulation symbols, e.g. mapped to QAM modulation symbols. Preferable only QPSK modulation symbols are used. However, in a less preferred variant higher modulation order symbols can be used to increase payload size. After mapping to one or more modulation symbols or, the modulation symbols may be portioned into groups of modulation symbols MS1-6, one group for each OFDM symbol. Each group of modulation symbols is then transform-precoded, typically using a DFT. The size of the preceding operator is equal to the number of allocated subcarriers used for this particular PUCCH.

The number of allocated used subcarriers (and thus the number of modulation symbols per symbol) or number of PRB(s) is e.g. configured (e.g. semi-statically configured via Radio Resource Control, RRC, signaling), dynamically indicated in a Downlink Control Information DCI message, or a combination thereof (e.g. RRC configures a few values and DCI selects one of the configured valued). If no multiplexing of users PUCCHs is performed (i.e. large payload) all subcarriers within allocated PRB(s) are assigned to one PUCCH, for large payload sizes even all subcarriers of multiple PRBs are assigned to the same PUCCH. When multiple PUCCH are multiplexed subcarriers of allocated PRB(s) are shared among PUCCHs in FDM, see FIG. 2.

Figure 2:
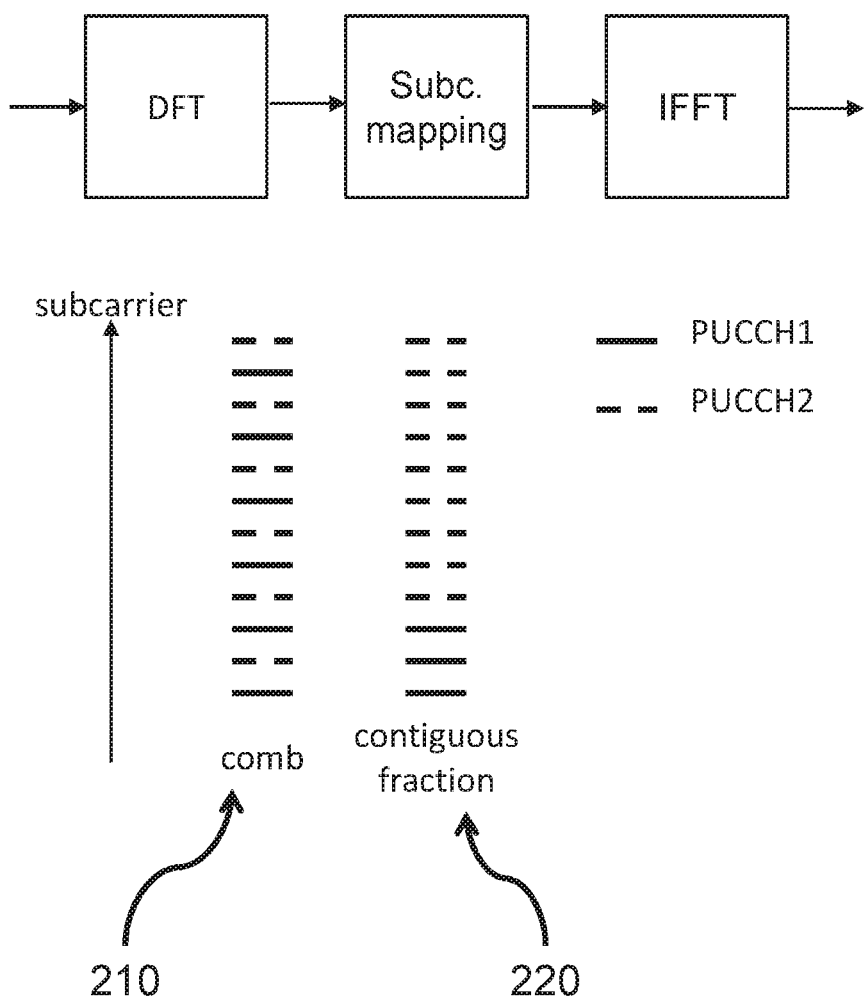
FIG. 2 shows how subcarriers are contiguously allocated or allocated according to a comb pattern according to one or more embodiments of the present disclosure.

FIG. 2 shows how subcarriers are contiguously allocated or allocated according to a comb pattern according to one or more embodiments of the present disclosure. Subcarriers allocated to be used by one PUCCH can either be contiguously allocated according to a contiguous fraction 220 or allocated according to a comb pattern 210. A contiguous fraction could e.g. be subcarriers 0 to 2 for PUCCH1 and subcarriers 3 to 11 for PUCCH2 (in case of one allocated PRB). In case of multiple allocated PRBs, this pattern could be repeated across allocated PRBs (less preferred since this increase PAPR) or all allocated PRBs are seen as one frequency-domain resource and the contiguous fractions are distributed from this one resource, e.g. subcarriers 0 to 5 for PUCCH1 and subcarriers 6 to 23 for PUCCH2 (assuming two PRB have been allocated to PUCCH). In case of comb one PUCCH is assigned every k-th subcarrier of allocated PRBs. We note that different comb densities, and thus payloads, can be multiplexed; e.g. PUCCH1 can be allocated to subcarriers 2k, PUCCH2 to subcarriers 1+4k, and PUCCH3 to subcarriers 3+4k. In the example in relation to FIG. 2, two combs are used.

A comb pattern-mapping is advantages w.r.t. generalization to multiple PRBs but may lead to inter-modulation products if the allocated subcarriers are few and far apart, e.g. two allocated subcarriers six subcarriers apart.

Multiple PUCCH can have the same PRB(s) allocated (configured, indicated in DCI, combination thereof) but use different subcarriers of it for its PUCCH. Which subcarriers to use out of the allocated PRB(s) can either be configured, indicated in the DCI, or a combination thereof. A user may for example have PRB(s) for its PUCCH and a number of different subcarriers-to-use pattern configured, and the DCI indicates which subcarriers-to-use pattern should be used. The different subcarriers-to-use pattern a UE is configured with, can have the same number of subcarriers or a varying number of subcarriers to cater for different payload sizes. Also implicit information, e.g. derived from the DL scheduling command (e.g. where the DCI-carrying control channel was located, details of the scheduling itself, e.g, how many component carriers are scheduled) can be used to (partly) determine the PUCCH resource.

Figure 3:
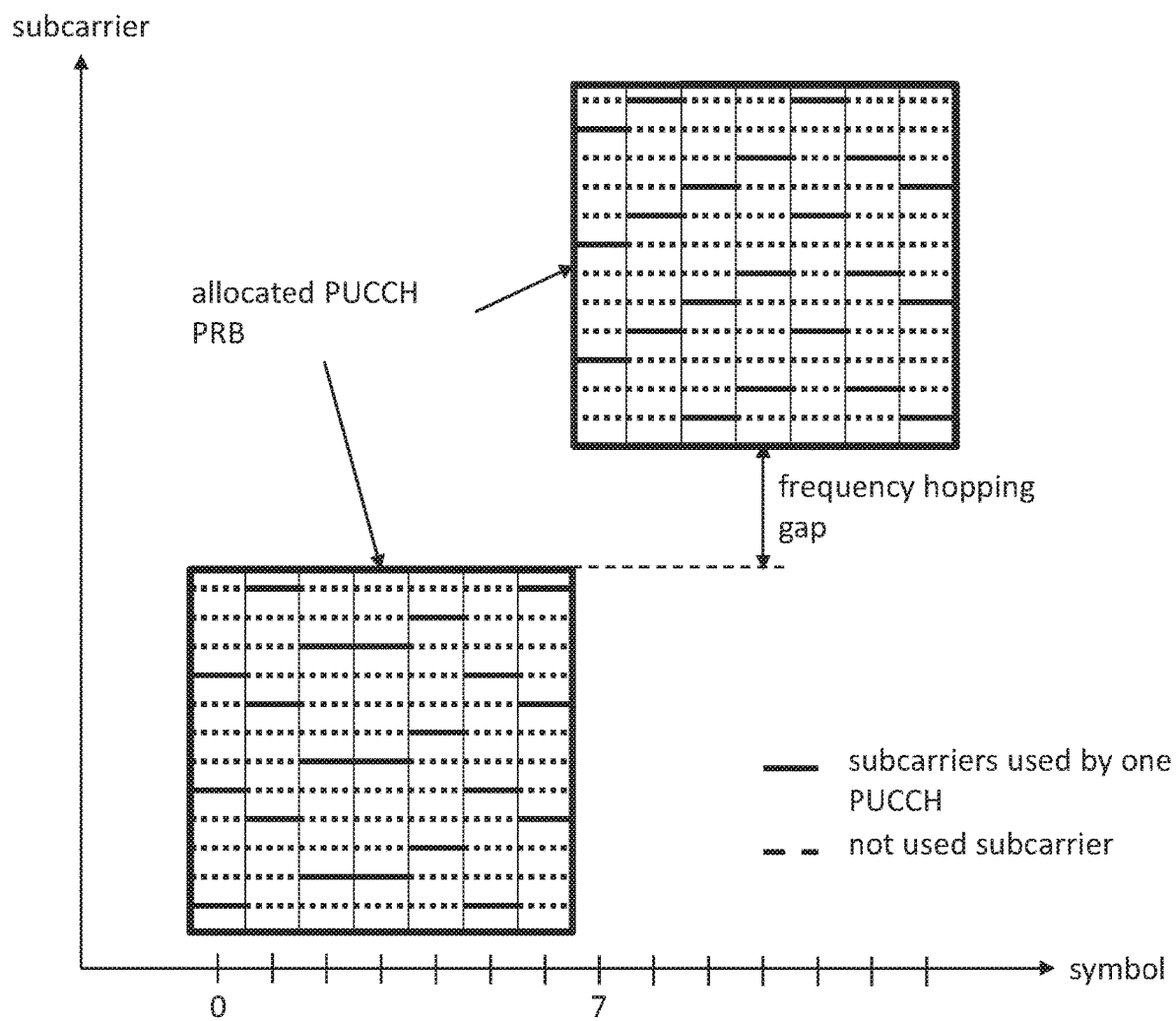
FIG. 3 shows how allocated subcarriers frequency hop between symbols according to one or more embodiments of the present disclosure.

FIG. 3 shows how allocated subcarriers frequency hop between symbols according to one or more embodiments of the present disclosure. To randomize (inter-cell) interference the subcarriers assigned to one or more PUCCHs within the allocated PRB(s) can vary across symbols according to a hopping pattern, as shown in FIG. 3. The hopping pattern must be shared by all multiplexed PUCCHs and could depend on a pseudo random sequence initialized by a configured value or depend on a (virtual) cell ID. To ensure the hopped subcarriers stays within the allocated PRBs a confinement operation such as a mod-operation with the number of totally allocated subcarriers may be performed.

To obtain frequency diversity it is preferable if the allocated PRB(s) hop within a PUCCH duration, in FIG. 3 the allocated PRB(s) are different for the first half and second half of the slot. Other hop distributions can be envisioned as well, but each hop must contain at least one DM-RS. If the one or more PUCCHs spans multiple slots, frequency hopping only across slots can be envisioned as well.

To randomize (inter-cell) interference the subcarriers assigned to PUCCH within the allocated PRB(s) can vary across symbols, as shown in FIG. 3.

Figure 4:
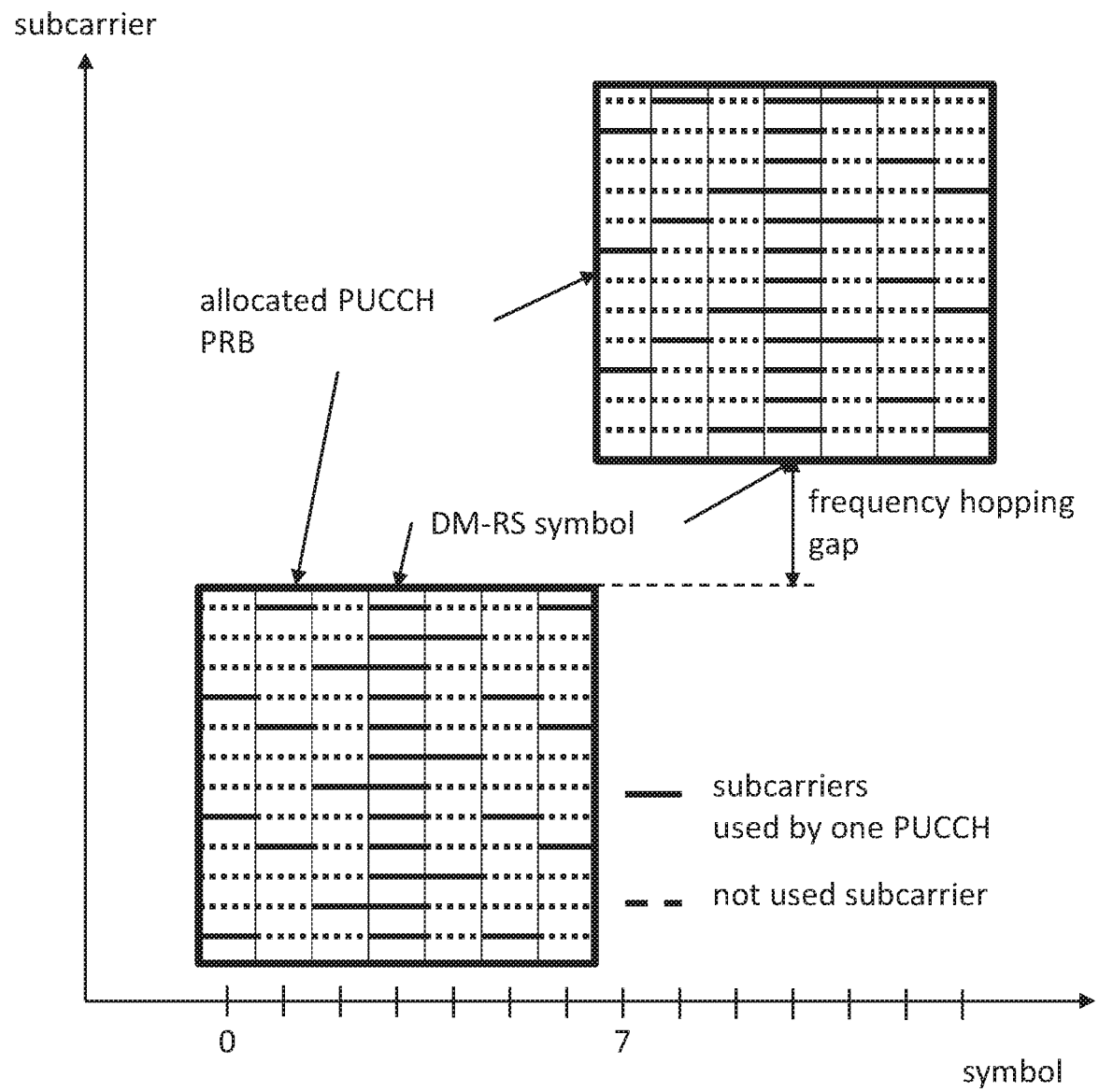
FIG. 4 shows how demodulation reference signals are allocated to all subcarriers of the allocated resources and UCI is allocated a subset of subcarriers of the allocated resources according to one or more embodiments of the present disclosure.

FIG. 4 shows how demodulation reference signals are allocated all subcarriers of the allocated resources and UCI is allocated a subset of subcarriers of the allocated resources according to one or more embodiments of the present disclosure. In FIG. 4, UCI is only carried on a subset of subcarriers of the allocated PRBs, in a comb pattern in this example. DM-RS are transmitted on all subcarriers of the allocated PRBs.

Figure 5:
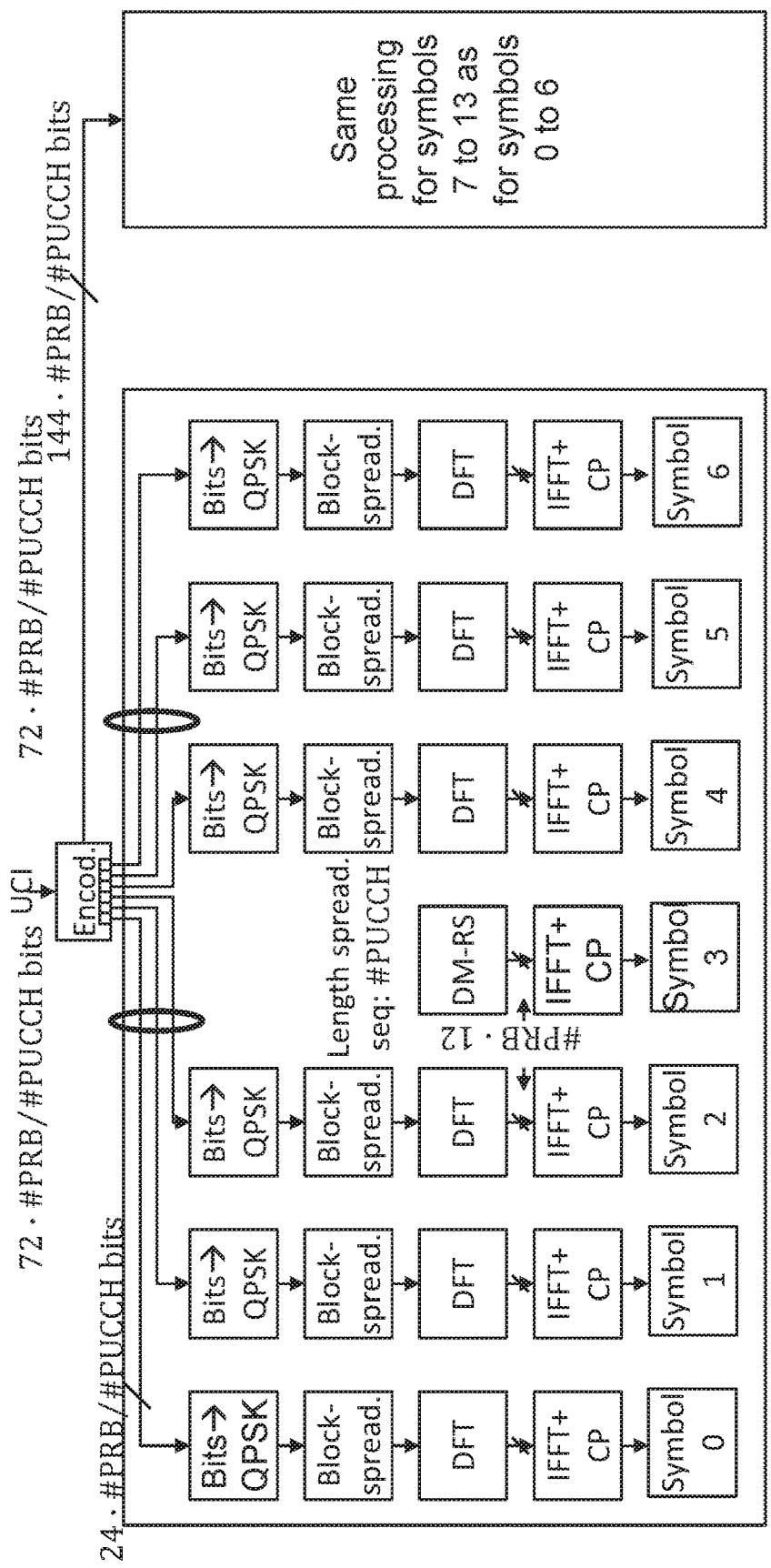
FIG. 5 shows a block diagram of a wireless device according to a further embodiment of the disclosure FIG. 6 schematically shows how a plurality of PUCCHS are spread over the allocated resources according to an embodiment of the present disclosure.

FIG. 5 shows a block diagram of a wireless device according to a further embodiment of the disclosure. In FIG. 5, a less preferred embodiment is shown where the PUCCH is based on DFTS-OFDM and time-domain multiplexing of PUCCH. An important difference compared to the previous scheme, shown in relation to FIG. 1, is how multiplexing of different PUCCHs is done or performed. In FIG. 2, a block diagram of PUCCH based on DFTS-OFDM and time-domain multiplexing of PUCCH is shown. It is assumed that QPSK modulation is used, a number #PRB of PRBs are allocated to the PUCCH, and a number #PUCCH of PUCCHs can be multiplexed. In one embodiment users are separated prior to DFT preceding in the time-domain. For example, every n-th modulation symbol to the DFT precoder could be assigned to one PUCCH and the remaining symbols to a second PUCCH, i.e. PUCCHs are separated using combs or comb patterns in the time-domain. In a second embodiment the time-domain modulation symbols are assigned per DFT precoder input in a possible even or irregular pattern to different PUCCH. However, drawback of both embodiments is that a PUCCH is not transmitted continuously or all the time, and thus energy of a PUCCH is not maximized.

It is therefore preferable to spread or block-spread a PUCCH in time-domain per DFT precoder input as shown in FIG. 5. Each PUCCH is transmitted all the time and thus the energy is maximized. To randomize interference, assignment of (block-) spreading sequence to PUCCH can vary across OFDM symbols, Symbol 0-6, using a pseudo random sequence as discussed in previous section. Further, DM-RS may be generated as in the previous section.

Figure 6:
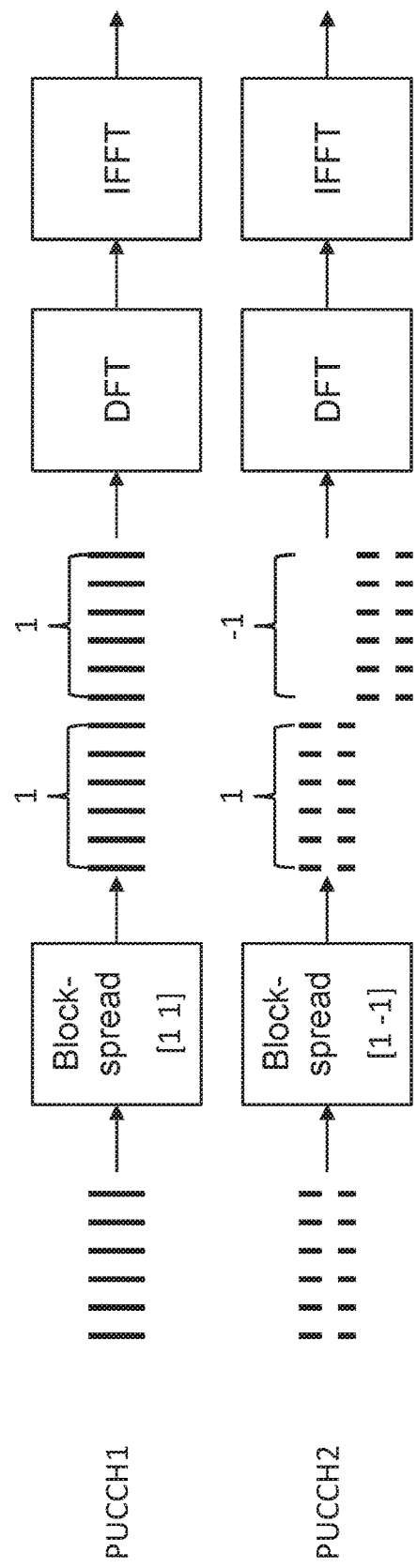

FIG. 6 schematically shows how a plurality of PUCCHS are spread over the allocated PRBs according to an embodiment of the present disclosure. The PUCCHs may be multiplexed in the time-domain per OFT-spread symbol using block-spreading. In this example one PRB is assigned. As can be seen in FIG. 6.

In some embodiments, the present disclosure can be expanded to include transmit diversity. In the previous sections multiplexing schemes of PUCCH have been discussed, using either FDM as disclosed in relation to FIG. 1 or (block-) spreading in time as disclosed in relation to FIG. 5. Transmit diversity of PUCCH can be enabled by not mapping different PUCCH to different frequency-domain resources or (block-) spreading sequences but transmit the same PUCCH multiple times using different resources, e.g. different frequency-domain resources or time-domain (block-) spreading sequences.

In some embodiments, the present disclosure can be further generalized. Even though outlined using DFTS-OFDM, the same principles can be applied for PUCCH based on OFDM. Multiple PUCCH are multiplexed within an OFDM symbol in frequency-domain, using either FDM (i.e. each PUCCH is only assigned a fraction of allocated PUCCH PRB(s)) or (block-) spreading in the frequency-domain.

Important aspects of the solution presented herein is a PUCCH structure with multi-PUCCH multiplexing capability where payload can be increased by increasing allocated PRB(s) and/or code rate. Multiplexing of PUCCH is done per symbol, i.e. not relying on block-spreading across OFDM symbols which make this format well suited for variable length transmissions. Different schemes to multi-plex users are described, such as FDM or (block-) spreading in time for DFTS-OFDM-based PUCCH and FDM or (block-) spreading in frequency for OFDM-based PUCCH. The most important embodiments can be summarized as:
1) PUCCH transmission over multiple symbols using OFDM or DFTS-OFDM, where the UCI is encoded and transmitted across symbols
2) 1 plus frequency-hopping of allocated PRB(s) across (group of) OFDM symbols
3) 1 plus payload size can be changed by varying the allocated frequency-domain allocation or modulation symbol order or code rate
4) 1 plus where multiple PUCCH are multiplexed within a symbol
5) 4 (for DFTS-OFDM PUCCH) plus multiplexing is done using FDM or (block-) spreading in time
6) 4 (for OFDM PUCCH) plus multiplexing is done using FDM or (block-) spreading in frequency
7) 5 and 6 plus where the allocation or (block-) spreading sequence varies across symbols
8) 4 plus where the DM-RS span the same or more subcarriers than UCI mapping do
9) 8 plus where DM-RS are multiplexed using different combs or cyclic shifts of a base sequence
10) 9 plus where the DM-RS resource (comb, cyclic shift) varies across DM-RS symbols
11) 1 plus where PUCCH is transmitted using transmit diversity
12) 11 plus where PUCCH is transmitted using multiple resources (compare with 4 and 5 above).

In one embodiment, a method for use in a wireless device in a wireless communication system for transmitting uplink control information, UCI, the method comprising mapping 740 modulation symbols or groups of modulation symbols of MS1-MS6 to a resource configuration, wherein the resource configuration is further indicative of allocated subcarriers comprised in one or more allocated resources, and transmitting 750 the modulation symbols or groups of modulation symbols MS1-MS6 using the allocated subcarriers.

In one embodiment, a method for use in a wireless device in a wireless communication system for transmitting uplink control information, UCI, the method comprising obtaining 710 UCI comprising a number of UCI bits, mapping 720 the UCI bits to a set of modulation symbols or groups of modulation symbols MS1-MS6, obtaining 730 a resource configuration, wherein the resource configuration is at least indicative of one or more allocated resources available for transmission of the modulation symbols, mapping 740 the modulation symbols or groups of modulation symbols MS1-MS6 to the resource configuration, wherein the resource configuration is further indicative of allocated subcarriers comprised in the one or more allocated resources, and transmitting 750 the modulation symbols or groups of modulation symbols using the allocated subcarriers.

Figure 7:
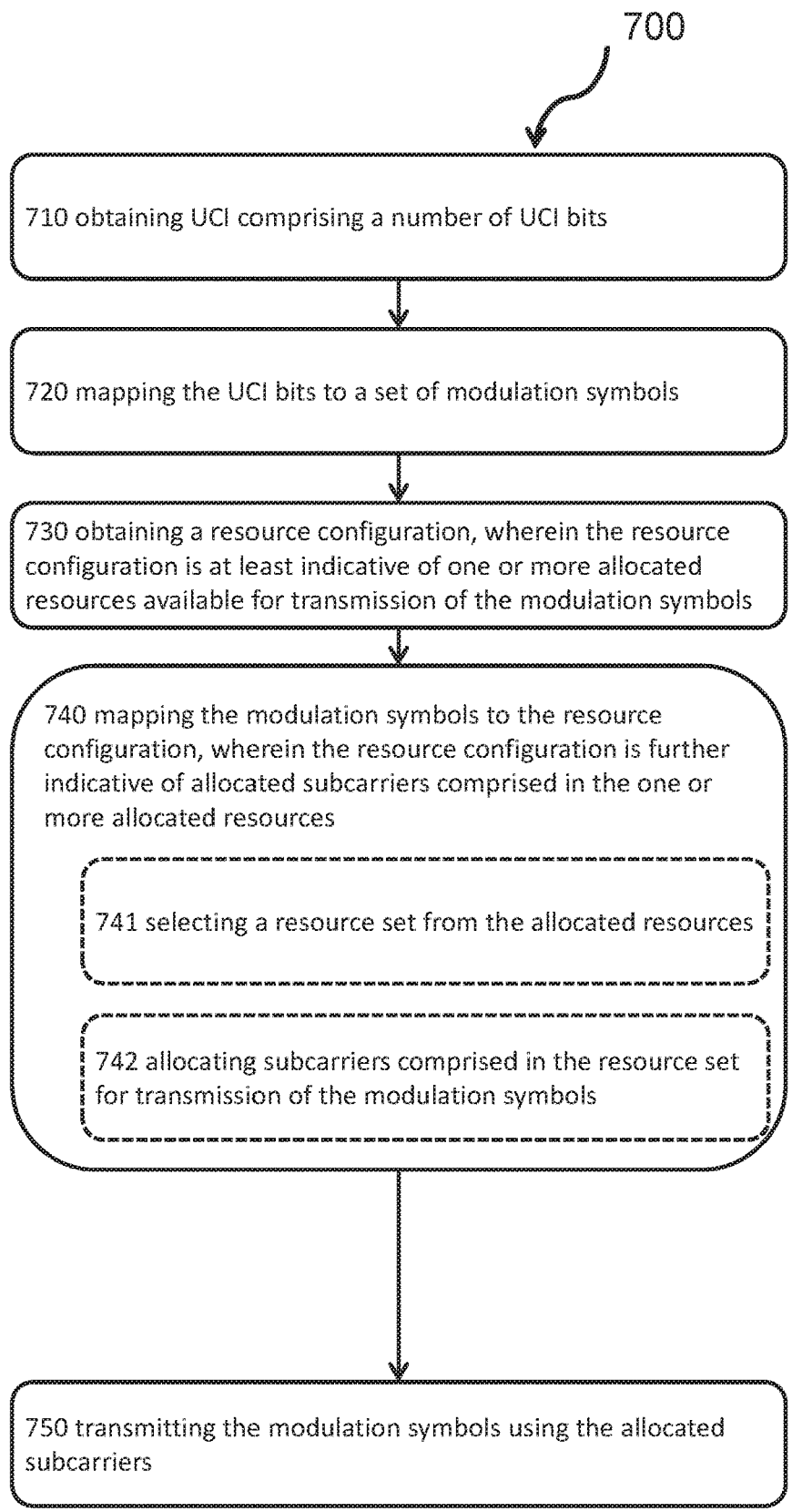
FIG. 7 shows a flowchart of a method according to one or more embodiments of the present disclosure.

FIG. 7 shows a flowchart of a method according to one or more embodiments of the present disclosure. The method may be implemented in a wireless device 100 configured for communication in a wireless communication network 300. The method comprises:

STEP 710: obtaining uplink control information, UCI, comprising a number of UCI bits. The UCI bits may be associated to a single PUCCH or a single user. Obtaining the UCI may e.g. comprise calculating the UCI by a processor based on a pre-defined rule, receiving the UCI from a network node or any other wireless communication network device or retrieving the UCI from a memory or other digital storage medium. PUCCH information of a PUCCH may be associated to one or more users. In one example, the UCI bits are all associated to a single PUCCH or user.

In an embodiment, the method further comprises encoding the UCI, e.g. as part of the obtaining step 710 described above. The UCI may e.g. be encoded with Polar codes, Reed Muller, other block codes known in the art, convolutional codes, LDPC codes or Turbo codes. The UCI may be encoded by codes that have an associated code rate. The code may be selected such that the resulting encoded UCI have a size that allows it to later be mapped to available physical resources, such as allocated PRBs. The code may be selected based on the number of UCI bits.

In an embodiment, a modulation order may further be selected such that the resulting payload have a size that allows the UCI bits to be accommodated. The modulation order may be selected based on the number of UCI bits.

In one embodiment, The UCI or UCI coded bits are portioned or split into mutually exclusive sets, one set for each symbol 0-6, e.g. time symbol such as an OFDM or DFTS-OFDM symbol. In a further embodiment, the mutually exclusive sets are then mapped to one or more modulation symbols or groups of modulation symbols in the mapping step 720 further described below. It is understood that encoding may also include scrambling, interleaving, and CRC attachment if applicable.

In one or more embodiments, the optional encoding step can comprise performing a repetition, which means that, at least partly, the same coded bits are transmitted in multiple symbols. In one example, the coded bit sequences comprised in the mutually exclusive sets mapped to modulation symbols 7 to 13 of a slot could be the same the mutually exclusive sets mapped to modulation symbols 0 to 6. It may be a preferred solution to rely on coding instead of repetition between first and second part within a slot. Another example of repetition is repeating PUCCH across multiple slots. The same coded bit sequences comprised in the mutually exclusive sets could be transmitted in multiple slots. One way to adjust payload size of the number of offered payload bits is to adjust the code rate of the encoding step, e.g. based on the number of UCI bits.

In a further embodiment, the method further comprises further performing any of a selection of the steps interleaving, and CRC attachment of the UCI bits.

STEP 720: The method may further comprise mapping the UCI bits to a set of modulation symbols. The mapping may be performed based on the number of UCI bits. Mapping the UCI bits may further comprise splitting the UCI bits into a plurality of mutually exclusive sets and mapping each of the mutually exclusive sets to a modulation symbol of the set of modulation symbols. The modulation symbols or groups of modulation symbols may be comprised in any modulation order, e.g. Quadrature amplitude modulation, QAM, modulation order such as Quadrature phase-shift keying, QPSK.

In an example QPSK is used and includes 4 possible symbols. The UCI is split into mutually exclusive sets of two bits, each mapped to one of the four available modulation symbols in QPSK. In one example, mapping the modulation symbols are further mapped to subcarriers of the one or more allocated PRBs.

In one further example, the modulation symbols are QPSK modulation symbols. Alternatively, the modulation symbols are higher order symbols, e.g. to increase payload size or the number of offered payload bits. After mapping to modulation symbols, the modulation symbols may be portioned into groups of modulation symbols, one group for each OFDM symbol. Each group of modulation symbols may optionally be transform-precoded by a precoding operator, e.g. using a discrete Fourier transform, DFT. The size of the precoding operator may be equal to the allocated number of subcarriers used for the one or more PUCCHs.

STEP 730: The method may further comprise obtaining resource configuration, such as a physical resource block, PRB, configuration. The PRB configuration may be indicative of time and frequency resources available or allocated for transmission of the modulation symbols. The resource configuration may at least be indicative of one or more allocated resources, such as PRBs, available for transmission of the modulation symbols. The resource configuration may also be indicative of subcarriers comprised in the allocated resources. In one example, the resource configuration is obtained by semi-static configuration based on received control signals comprising RRC signaling or control signaling. In a further example, the resource configuration is obtained by dynamical indication in a DCI message. In a further example the resource configuration is obtained by a combination of the previous examples, e.g. by configuring based on received RRC signaling a few values and selecting one of the configured values based on one or more DCI messages.

STEP 740: The method may further comprise mapping the modulation symbols or groups of modulation symbols to the resource configuration. Mapping may in one embodiment depend on a UCI size or the number of UCI bits, e.g. mapping the UCI to multiple resources such as PRBs.

In a non-limiting example the UCI is split into mutually exclusive sets of two bits that are each mapped to QPSK modulation symbols. After mapping to modulation symbols, the modulation symbols may optionally be portioned into groups of modulation symbols, one group for each symbol, e.g. time symbol such as an OFDM or DFTS-OFDM symbol. Each group of modulation symbols may optionally be transform-precoded with a precoding operator or matrix, typically using a OFT. The size of the precoding operator is equal to the number of allocated subcarriers used for the PUCCH to be transmitted. The number of allocated subcarriers (and thus the number of modulation symbols per symbol) or the number of PRBs is configured, e.g. based on the desired payload in the form of UCI bits. The configuration may e.g. be semi-statically configured via RRC signaling, dynamically indicated in a DCI message, or a combination thereof. All subcarriers within the allocated PRB(s) may be assigned to the PUCCH or multiple PUCCH originating from multiple wireless devices may be multiplexed onto or allocated to non-overlapping sets of subcarriers comprised in the allocated PRBs. The allocated subcarriers may optionally be allocated either in a contiguous fraction or arranged in a comb pattern, as described in relation to FIG. 2. In yet an example subcarriers may be allocated in a contiguous fraction by allocating subcarriers 0 to 2 for PUCCH1 sent from a first wireless device and subcarriers 3 to 11 for PUCCH2 sent from a second wireless device to the same network node. The selection of subcarriers comprised in the allocated PRBs can, as previously described, either be configured by RRC control signaling, indicated in the downlink control information DCI, or a combination thereof. A user may for example have allocated PRBs to its PUCCH and a number of different subcarriers-to-use pattern configured. DCI then indicates which subcarriers-to-use pattern should be used. The different subcarriers-to-use pattern a UE is configured with can have the same number of subcarriers or vary to cater for different payload sizes. Also implicit information, e.g. derived from the DL scheduling command (e.g. where the DCI-carrying control channel was located, details of the scheduling itself, e.g. how many component carriers are scheduled) can be used to (partly) determine the PUCCH resources, such as PRBs or subcarriers comprised therein.

OPTIONAL STEP 741: In an embodiment, the method 700 further comprises selecting a resource set from the allocated resources, and allocating subcarriers comprised in the resource set for transmission of the modulation symbols, e.g. transmitted as symbols or time-symbols such as OFDM or DFTS-OFDM symbols. In one example the PRB configuration indicates a plurality of PRB sets comprising varying number of PRBs. A PRB set is selected by the device and used for transmission of the modulation symbols. The PRB set may comprise a single PRB or a plurality of PRBs. In one example, a set of subcarriers comprised in the one or more allocated PRBs are obtained or selected and the modulation symbols are mapped to the selected set, e.g. to form symbols or time-symbols such as OFDM or DFTS-OFDM symbols.

OPTIONAL STEP 742: In an embodiment, the method 700 further comprises selecting a subcarrier set from the allocated resources, e.g. based on the number of UCI bits.

In one embodiment, the step of mapping 740 the modulation symbols MS1-MS6 further comprises selecting 741 a resource set from the allocated resources, and allocating 742 subcarriers comprised in the resource set for transmission of the modulation symbols.

In one embodiment, the resource set comprises a single Physical Resource Block, PRB.

In one embodiment, the resource set comprises a plurality of PRBs.

STEP 750: The method may further comprise transmitting the modulation symbols, typically using the allocated subcarriers. The modulation symbols or groups of modulation symbols may be transmitted over the selected subcarrier set, subcarriers comprised in the resource set or subcarriers comprised in the resource configuration. The modulation symbols or groups of modulation symbols may be comprised in symbols, such as OFDM symbols.

In an embodiment, the method 700 further comprises determining that the number of UCI bits is less than or equal to a number of payload bits offered by the resource set or allocated resources before performing the step of allocating the subcarriers. Upon determining that the number of UCI bits is greater than the number of payload bits offered by allocated resources, the method further comprise any of increasing the code rate used to encode the UCI and/or UCI bits, increasing the modulation order used for the obtained modulation symbols or increasing the number of resources in the allocated resources. Thus, the wireless device can ensure that the UCI bits can be transmitted and that only the required numbers of resources, e.g. PRBs, are used. This will at least reduce the overall interference level in the wireless communication system.

In an embodiment, the resource configuration is further indicative of allocated subcarriers comprised in the one or more allocated resources.

In an example, the wireless device receives control signaling, e.g. from the network node or any other node in the wireless communications network. The control signaling is indicative of allocated subcarriers and the wireless device will use the allocated subcarriers to transmit the modulation symbols, e.g. as symbols or time-symbols such as OFDM or DFTS-OFDM symbols.

In one example, multiple PUCCHs can have the same PRBs allocated but use different subcarriers of the allocation for its PUCCH. Which subcarriers to use, out of the allocated PRBs may be configured based on received RRC signaling or based on one or more DCI messages, as previously described. In a further example, a user may for example have PRBs for its associated PUCCH and a number of different subcarriers-to-use pattern configured. DCI may then indicate which subcarriers-to-use pattern to use. The different subcarriers-to-use patterns a UE is configured with may have the same number of subcarriers or vary the number of subcarriers to cater for different payload sizes or required offered payload bits. Also implicit information, e.g. derived from the DL scheduling command, may be used to determine the PUCCH resources. The implicit information may include where the DCI-carrying control channel was located, details of the scheduling itself, e.g. how many component carriers are scheduled.

With reference to FIG. 2, the subcarriers may be contiguously allocated or allocated according to a comb pattern. Comb patterns are further described in relation to FIG. 2. In one example, a comb pattern uses every k-th subcarrier of the allocated PRBs. In one example, a first wireless device transmitting PUCCH1 can be allocated to subcarriers with a comb pattern 2k. A second wireless device transmitting PUCCH2 can be allocated to subcarriers with a comb pattern 1+4k. A third wireless device transmitting PUCCH3 can be allocated to subcarriers with a comb pattern 3+4k. In the example in FIG. 2 two combs are used.

In one embodiment, the allocated subcarriers are contiguously allocated or allocated according to a comb pattern.

In an embodiment, the method 700 further comprises transform precoding the set of modulation symbols or groups of modulation symbols based on a number of used subcarriers or based on a number of allocated subcarriers.

In an embodiment, the method 700 further comprises transform precoding the set of modulation symbols or groups of modulation symbols based on a number of used subcarriers or based on a number of allocated subcarriers.

In an embodiment, the allocated PRBs available for transmission of the modulation symbols or groups of modulation symbols are further allocated for transmission of demodulation reference signals, DMRS. Alternatively, subcarriers comprised in the allocated PRBs, used for transmission of the modulation symbols, and additional subcarriers, comprised in the allocated PRBs, are used for transmission of demodulation reference signals, DMRS.

In one example, the DM-RS are assigned or allocated to the same subcarriers used by a PUCCH for UCI. This can have the disadvantage that—when PUCCH only uses a few subcarriers, the (inter-cell) interference can be high. In a further example, more or additional subcarriers are allocated for DM-RS than what is allocated for PUCCH data/UCI. This would be in the simplest case all subcarriers of all allocated PRBs) (per frequency hopping leg), alternatively a dense comb. Multiplexing of users can be done using combs and/or using CDM, e.g. differently cyclic shifted base sequences assigned to different PUCCHs (all PUCCH DM-RS use the same base sequence, at least those one sharing a comb). The combs or cyclic shifts can vary across DM-RS symbols in a pseudo random way to further randomize interference. Initialization of the pseudo random sequence generator can be based on a configured value or depend on (virtual) cell ID. To improve noise estimate it could be mandated that the DM-RS and the UCI are transmitted with a defined power relative to each other (e.g. the same)—irrespective of the number of used subcarriers.

In an embodiment, the method 700 further comprises repeating the step of mapping the modulation symbols to the PRB configuration, wherein the subcarriers differ between different symbols. In one example, this may involve using different subcarriers for symbol 0 and symbol 1. In one example, transmit diversity of PUCCH can be enabled by not mapping different PUCCHs from different wireless devices to different frequency-domain resources or (block-) spreading sequences. Instead, the same PUCCH can be transmitted multiple times using different resources, e.g. different frequency-domain resources or (block-) spreading sequences.

In one embodiment, the method further comprises repeating the step of mapping the modulation symbols to the resource configuration, wherein the allocated subcarriers differ between different modulation symbols or groups of modulation symbols or groups of modulation symbols MS1-MS6.

In one example, a set of PRBs may be selected based on the number of UCI bits. In an example, where a single PUCCH comprises UCI in the form of PUCCH information that requires a large payload size or number of offered payload bits. All subcarriers of multiple PRBs may be assigned to the same PUCCH. In other words, the method described in relation to FIG. 7 may further comprise determining that the number of UCI bits is less than or equal to a number of payload bits offered by a PRB set, the set being selected from the allocated PRBs indicated by the PRB configuration.

In an embodiment, the method further comprises determining that the number of UCI bits is less than or equal to a number of payload bits offered by the resource set before performing the step of allocating the subcarriers and adapting a code rate or a modulation order to accommodate additional payload bits.

In an example, the PRB configuration is indicative of a number M of PRBs being available or allocated for transmission of the modulation symbols. A set of N PRBs, where N<=M, may then be selected based on the number of UCI bits such that the number of offered payload bits offered by the set of the N PRBs is larger or equal to the number of UCI bits. The method described in relation to FIG. 7 may further comprise allocating or making available subcarriers comprised in the whole PRB set for transmission of the modulation symbols. In one example, all subcarriers comprised in the N PRBs are allocated for the transmission of the modulation symbols.

Figure 8:
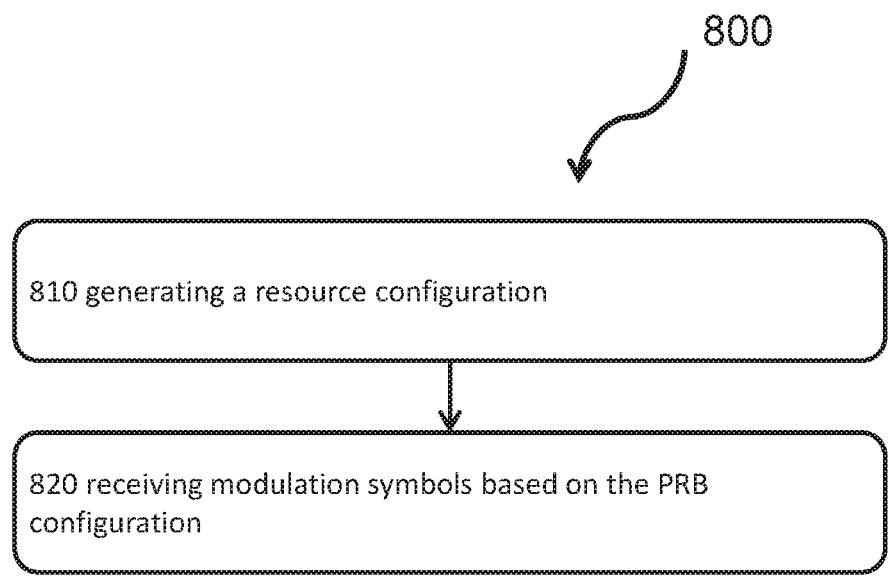
FIG. 8 shows a flowchart of a method 800 according to the present disclosure.

FIG. 8 shows a flowchart of a method 800 according to the present disclosure. The method 800 may be implemented in a network node configured for communication in a wireless communication network 300. The method comprises:

STEP 810: generating 810 a resource configuration, such as a physical resource block, PRB, configuration. The resource configuration may at least be indicative of one or more allocated resources to be used by at least one wireless device for transmission of modulation symbols.

STEP 820: receiving 820 modulation symbols based on the PRB configuration. The modulation symbols may be demodulated to uplink control information, UCI, associated to at least one physical uplink control channel, PUCCH. The resource configuration may further be indicative of subcarriers comprised in the one or more allocated PRBs. The resource configuration is further described in relation to FIG. 7. The modulation symbols can be QAM or QPSK symbols as further described in relation to FIGS. 1 and 7.

In an embodiment, the method comprises generating 810 a resource configuration, wherein the resource configuration is at least indicative of one or more allocated resources to be used by at least one wireless device for transmission of modulation symbols, receiving 820 modulation symbols contiguously allocated or allocated based on the resource configuration, the modulation symbols comprising control information, UCI, associated to at least one PUCCH.

In an embodiment of the method 800, the modulation symbols are demodulated or detected to a plurality of uplink control information, UCI, each UCI being associated to a different PUCCH and being received on different sets of subcarriers of the one or more allocated PRBs.

In an embodiment, the modulation symbols are mapped to a plurality of uplink control information, UCI, bit sets, the UCI sets being associated to different PUCCHs and being received on different sets of subcarriers of the one or more allocated resources.

In an embodiment of the method 800, the subcarriers on which each UCI are received are contiguously allocated or allocated according to a comb pattern. Comb patterns are further described in relation to FIG. 2.

In an embodiment, the subcarriers on which each UCI set is received are contiguously allocated or allocated according to a comb pattern.

In an embodiment of the method 800, where receiving the modulation symbols is performed on subcarriers comprised in a PRB set selected from the allocated PRBs. The subcarriers may be selected based on received control signaling, the number of UCI bits or the PRB configuration. The PRB configuration may be indicative of a number of allocated subcarriers. The PRB set comprises a single PRB or a plurality of PRBs.

In an embodiment, receiving the modulation symbols is performed on subcarriers comprised in a resource set selected from the allocated resources.

In an embodiment, the resource set comprises a single PRB.

In an embodiment, the resource set comprises a plurality of PRBs.

Figure 9:
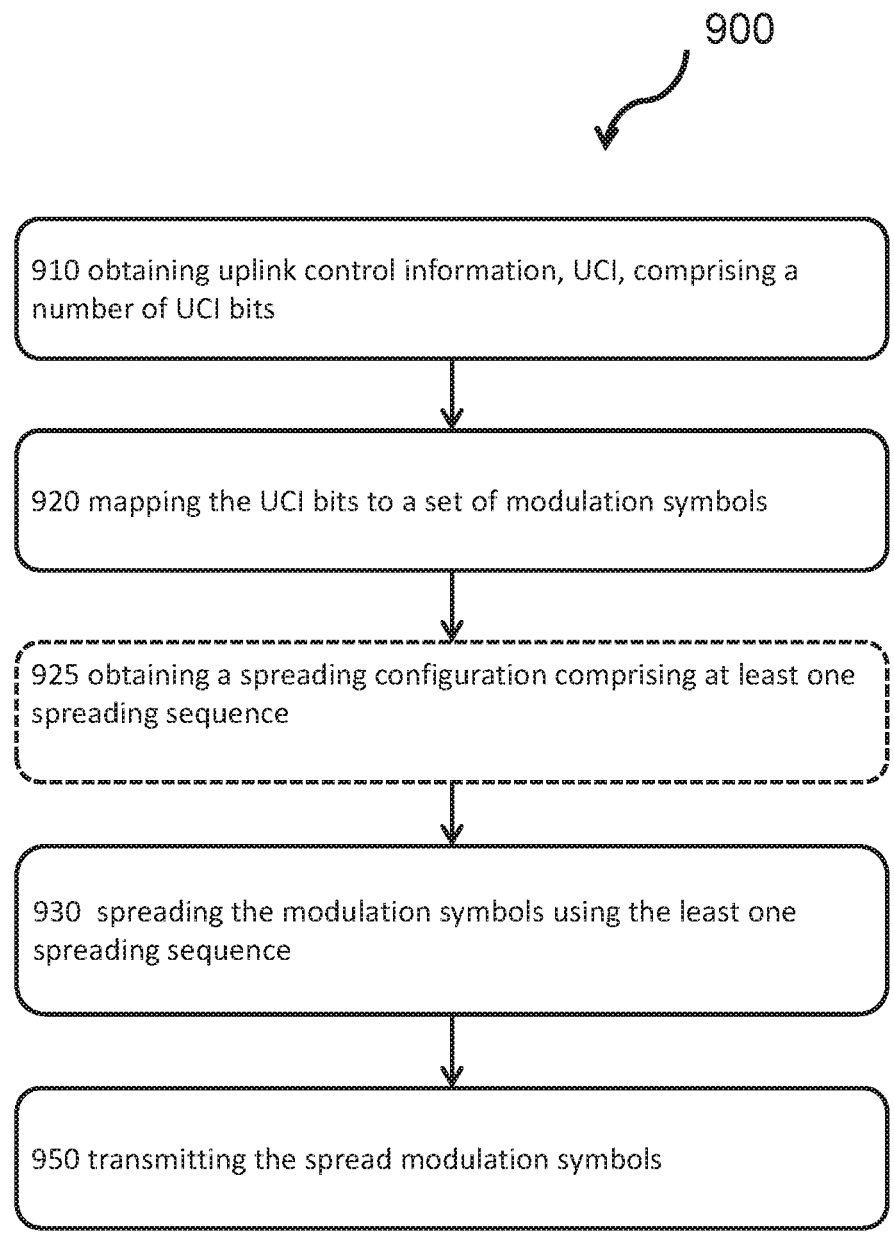
FIG. 9 shows a flowchart of a method 900 according to the present disclosure.

FIG. 9 shows a flowchart of a method 900 according to the present disclosure. The method 900 may be implemented in a wireless device 100 configured for communication in a wireless communication network 300. The method comprises: obtaining 910 uplink control information, UCI, comprising a number of UCI bits. The step of obtaining UCI can be performed in a similar manner as described in relation to FIG. 7. The method may further comprise mapping 920 the UCI bits to a set of modulation symbols. Mapping the UCI bits to a set of modulation symbols can be performed in a similar manner as described in relation to FIG. 7. The method may further comprise obtaining 925 a spreading configuration, comprising at least one configured spreading sequence. Obtaining the spreading configuration may e.g. comprise calculating the spreading configuration by a processor based on a pre-defined rule, receiving the spreading configuration from a network node or any other wireless communication network device or retrieving the spreading configuration from a memory or other digital storage medium. The method may further comprise (block) spreading 930 the modulation symbols using the least one configured spreading sequence. Spreading is further described in relation to FIGS. 5 and 6. The method may further comprise transmitting 950 the spread modulation symbols.

In an embodiment, the method 900 further comprises performing any of a selection of the steps encoding, scrambling, interleaving, and CRC attachment of the UCI bits, as further described in relation to FIG. 7.

In an embodiment, the method further comprises performing any of a selection of the steps encoding, scrambling, interleaving, and CRC attachment of the UCI bits.

In an embodiment, the method 900 further comprises obtaining a resource configuration, such as a physical resource block, PRB, configuration. The resource configuration may at least be indicative of one or more allocated PRBs available for transmission of the modulation symbols. Spreading of the modulation symbols may be performed over the one or more allocated resources.

In an embodiment, the method 900 further comprises selecting a subcarrier set from the allocated resources, and spreading the modulation symbols over the selected subcarriers. Selecting subcarriers may be performed in a similar manner as described in relation to FIG. 7.

In an embodiment, the method 900 further comprises transform precoding the set of modulation symbols, e.g. using a precoding matrix. The precoding matrix size may be based on a number of used subcarriers or based on a number of allocated subcarriers comprised in the PRB configuration. The precoding matrix size may be based on a number of configured spreading sequences comprised in the spreading configuration.

In an embodiment, the method 900 further comprises transform precoding the set of modulation symbols based on a number of used subcarriers or based on a number of allocated subcarriers.

In an embodiment, the allocated resources available for transmission of the modulation symbols are further allocated for transmission of demodulation reference signals, DMRS. In an embodiment, subcarriers comprised in the allocated PRBs, used for transmission of the modulation symbols, and additional subcarriers, comprised in the allocated PRBs, are used for transmission of demodulation reference signals, DMRS. The transmission of demodulation reference signals is further described in relation to FIG. 4.

In one embodiment, the allocated resources available for transmission of the modulation symbols are further allocated for transmission of demodulation reference signals, DMRS.

In one embodiment, subcarriers comprised in the allocated resources, used for transmission of the modulation symbols, and additional subcarriers further comprised in the allocated resources, are used for transmission of demodulation reference signals, DMRS.

In one embodiment, the resources allocated for transmission of DMRS include all subcarriers comprised in the one or more allocated resources, or wherein the resources allocated for transmission of DMRS include a subset of subcarriers, comprised in the one or more allocated resources, wherein the subset of subcarriers are contiguously allocated or allocated according to a comb pattern.

In an embodiment, the spreading configuration comprises a plurality of configured spreading sequences, and the method 900 further comprises selecting one configured spreading sequence from the set of configured spreading sequences for spreading the set of modulation symbols. The selection of one configured spreading sequence may be performed based on control information received from a network node, such as a gNB, or based on an UCI size indicative of the number of UCI bits.

In an embodiment, the at least one configured spreading sequence used for spreading the modulation symbols varies across symbols.

In an embodiment, the method 900 further comprises performing a transform of the spread modulation symbols. In one example, a DFT transform is performed.

Figure 10:
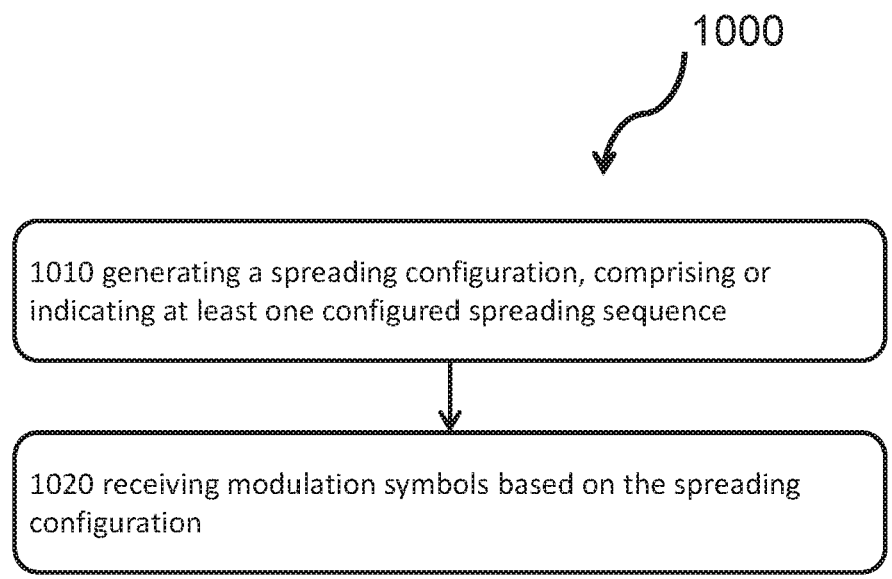
FIG. 10 shows a flowchart of a method 1000 according to the present disclosure.

FIG. 10 shows a flowchart of a method 1000 according to the present disclosure. The method 1000 may be implemented in a network node configured for communication in a wireless communication network 300. The method comprises generating 1010 a spreading configuration, comprising or indicating at least one configured spreading sequence. The method may further comprise receiving 1020 modulation symbols based on the spreading configuration. The modulation symbols may further be demodulated or detected to uplink control information, UCI, associated to at least one PUCCH.

In an embodiment, the modulation symbols are demodulated to a plurality of uplink control information, UCI, each UCI is being associated to a different PUCCH and being received using a different spreading sequence. In one example, each modulation symbol is demodulated and the resulting demodulated bits are associated to a unique PUCCH or PUCCH identity representing the PUCCH. The associated demodulated bits can then be combined to a UCI, where each UCI is associated to a PUCCH or PUCCH identity.

In one embodiment, the method 1000 further comprises generating a physical resource block, PRB, configuration, where the PRB configuration is at least indicative of one or more allocated PRBs available for transmission of the modulation symbols. Receiving the modulation symbols may be performed over the one or more allocated PRBs or subcarriers comprised in the one or more allocated PRBs.

Figure 11:
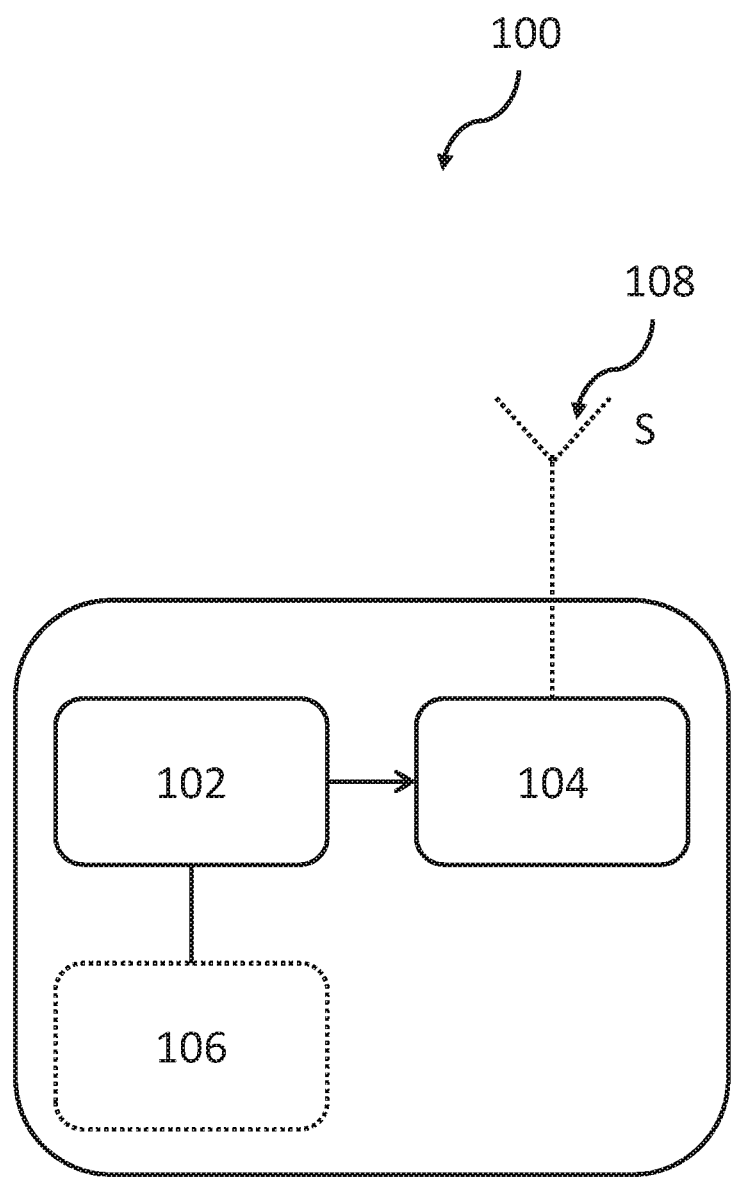
FIG. 11 shows a wireless node configured for communication in a wireless communication network according to one or more embodiments of the present disclosure.

FIG. 11 shows a wireless node configured for communication in a wireless communication network. The wireless device comprises circuitry comprising a processor, and a memory, said memory containing instructions executable by said processor, whereby said first wireless device is operative to perform the method of any of embodiments described herein. The processor 102 is communicatively coupled to a transceiver 104. Further, the wireless device 100 may further comprise one or more optional antennas 108, as shown in FIG. 11. The antenna/s 108 is/are coupled to the transceiver 104 and is configured to transmit and/or emit and/or receive a wireless signals S in a wireless communication system, e.g. transmit UCI comprised in and/or included as symbols in the wireless signals S. The processor and/or a processor unit may be, e.g. processing circuitry and/or a central processing unit and/or processor modules and/or multiple processors configured to cooperate with each-other. The circuitry may further comprise a memory 106. The memory may contain instructions executable by the processor 102 to perform the methods described herein. The processor may be communicatively coupled to any or all of the transceiver 104 and memory 106. In this disclosure a wireless device 100 may refer to a wireless node, a user equipment UE, wireless terminal, mobile phone, smart phone, network node, network control node, network access node, an access point or a base station, e.g., a Radio Base Station (RBS), which in some networks may be referred to as transmitter, "gNB", "eNB", "eNodeB", "NodeB" or "B node", depending on the technology and terminology used. The wireless devices or wireless nodes may be of different classes such as, e.g., macro eNodeB, home eNodeB or pico base station, based on transmission power and thereby also cell size. The wireless node can be an 802.11 access point or a Station (STA), which is any device that contains an IEEE 802.11-conformant Media Access Control (MAC) and Physical Layer (PHY) interface to the Wireless Medium (WM). The wireless device 100 is however not limited to the above mentioned wireless devices and/or wireless nodes.

The network node may comprise all or a selection of features as described in relation to FIG. 11. The network node may be referred to as transmitter, "gNB", "eNB", "eNodeB", "NodeB" or "B node", depending on the technology and terminology used.

In an embodiment, a wireless node 100 is provided and configured for communication in a wireless communication network, comprising circuitry comprising a processor, and a memory, said memory containing instructions executable by said processor, whereby said first wireless node 100 is operative to perform any of the methods described herein.

In an embodiment, a computer program comprising computer-executable instructions for causing a wireless node 100, when the computer-executable instructions are executed on a processing unit comprised in the wireless node, to perform any of the methods described herein.

In an embodiment, a computer program product comprising a computer-readable storage medium, the computer-readable storage medium having the computer program above embodied herein.

In an embodiment, a network node 200 configured for communication in a wireless communication network, comprising circuitry comprising a processor, and a memory, said memory containing instructions executable by said processor, whereby said first network node 200 is operative to perform any of the methods described herein.

In an embodiment, a computer program comprising computer-executable instructions for causing a network node, when the computer-executable instructions are executed on a processing unit comprised in the network node, to perform any of the methods described herein.

In an embodiment, a computer program product comprising a computer-readable storage medium, the computer-readable storage medium having the computer program above embodied therein.

In an embodiment, a computer program is provided and comprising computer-executable instructions for causing a wireless device, when the computer-executable instructions are executed on a processing unit comprised in the wireless device, to perform any of the method steps described herein. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

In an embodiment, a computer program product comprising a computer-readable storage medium, the computer-readable storage medium having the computer program described above embodied therein.

Figure 12:
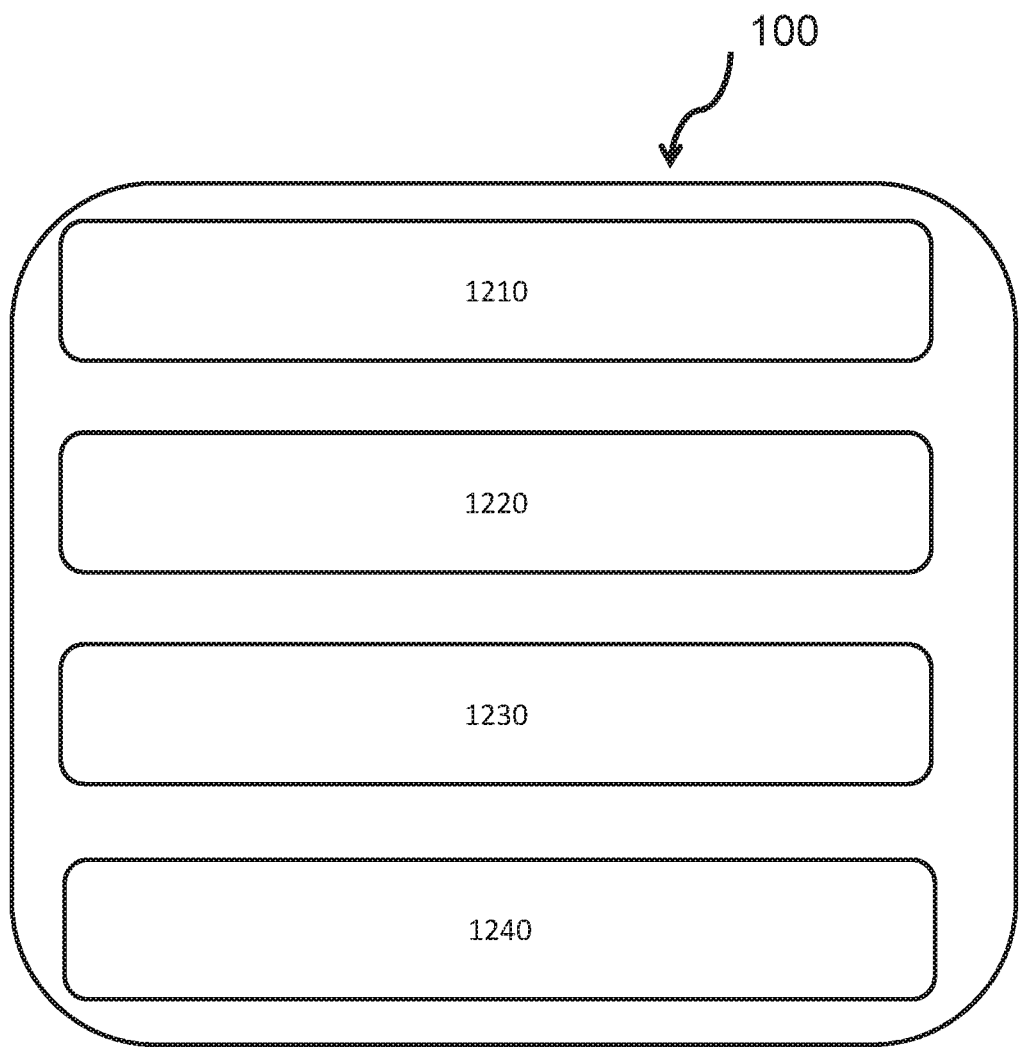
FIG. 12 shows a wireless device according to one or more embodiments of the present disclosure.

FIG. 12 shows a wireless device according to the present invention. The wireless device interacting with a network node, the wireless device comprising a first obtaining module 1210 for obtaining uplink control information, UCI, comprising a number of UCI bits, a first mapping module 1220 for mapping the UCI bits to a set of modulation symbols, a second obtaining 1230 module for obtaining a resource configuration, such as a physical resource block, PRB, configuration, wherein the resource configuration is at least indicative of one or more allocated resources available for transmission of the modulation symbols, a second mapping 1240 module for mapping the modulation symbols to the resource configuration.

Figure 13:
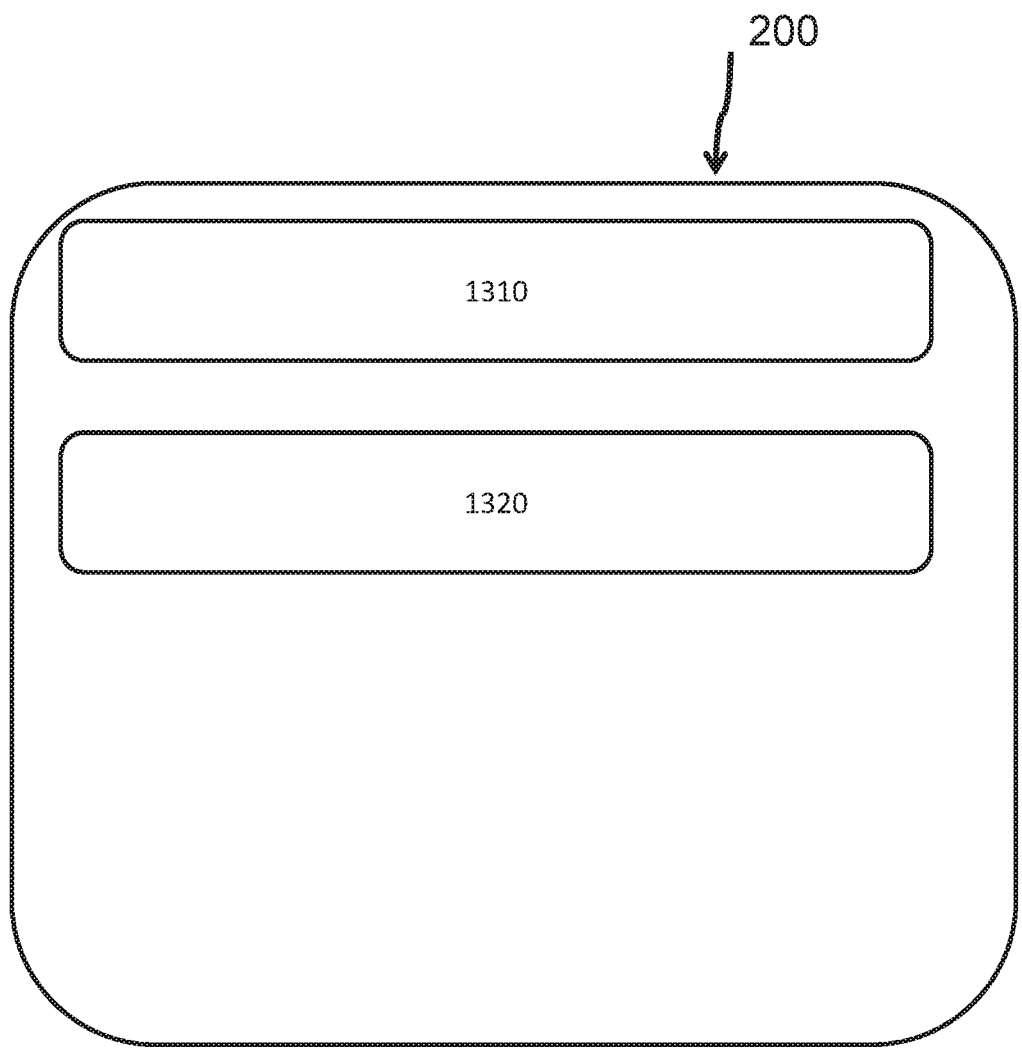
FIG. 13 shows a network node according to one or more embodiments of the present disclosure.

FIG. 13 shows a network node according to the present invention. The network node interacting with a wireless device, the network node comprising: a first generating module 1310 for generating a resource configuration, such as a physical resource block, PRB, configuration, wherein the resource configuration is at least indicative of one or more allocated resources to be used by at least one wireless device for transmission of modulation symbols, a first receiving module 1320 for receiving modulation symbols based on the resource configuration, the modulation symbols being demodulated to uplink control information, UCI, associated to at least one PUCCH.

Figure 14:
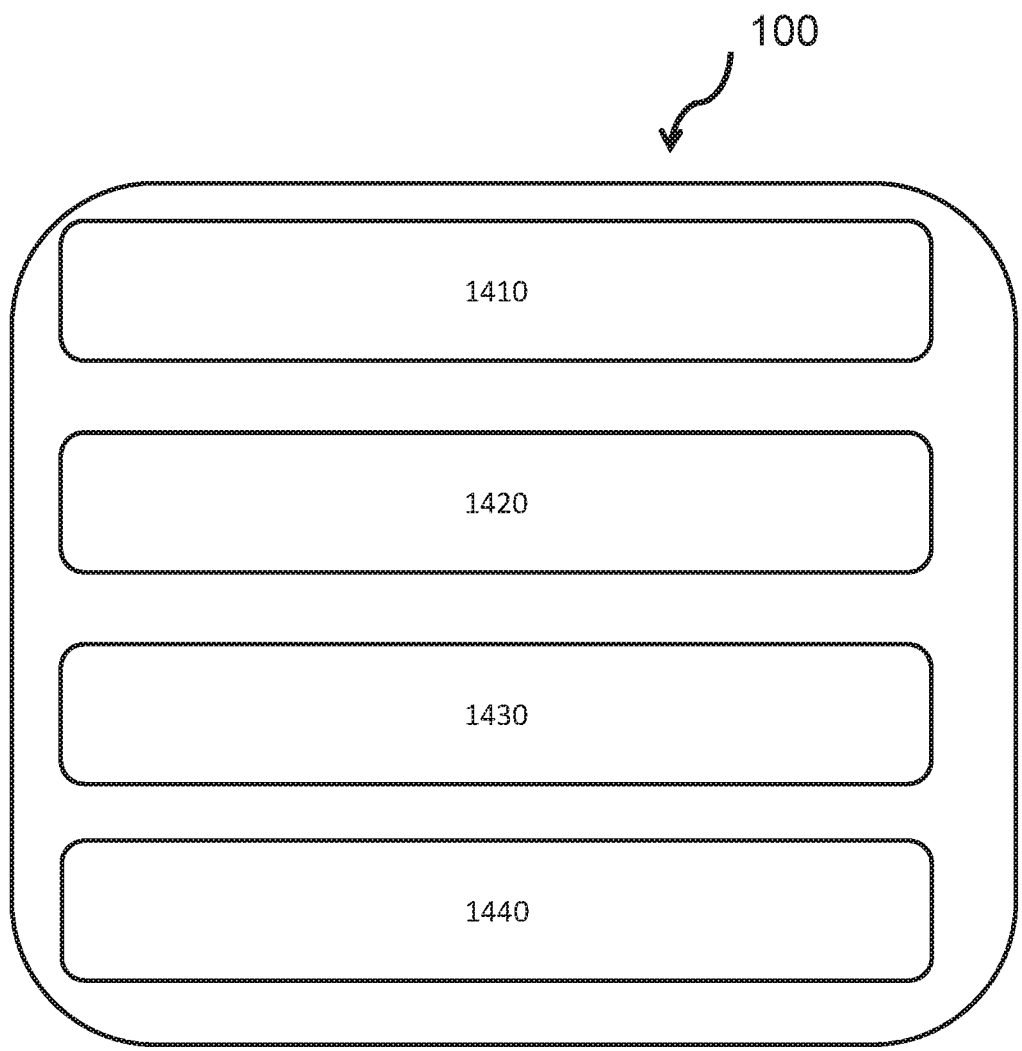
FIG. 14 shows a wireless device according to one or more embodiments of the present disclosure.

FIG. 14 shows a wireless device according to the present invention. The wireless device interacting with a network node, the wireless device comprising a third obtaining module 1410 for obtaining uplink control information, UCI, comprising a number of UCI bits, a third mapping module 1420 for mapping the UCI bits to a set of modulation symbols, a fourth obtaining module 1430 for obtaining a spreading configuration, comprising at least one configured spreading sequence.

a spreading module 1440 for spreading the modulation symbols using the least one configured spreading sequence.

Figure 15:
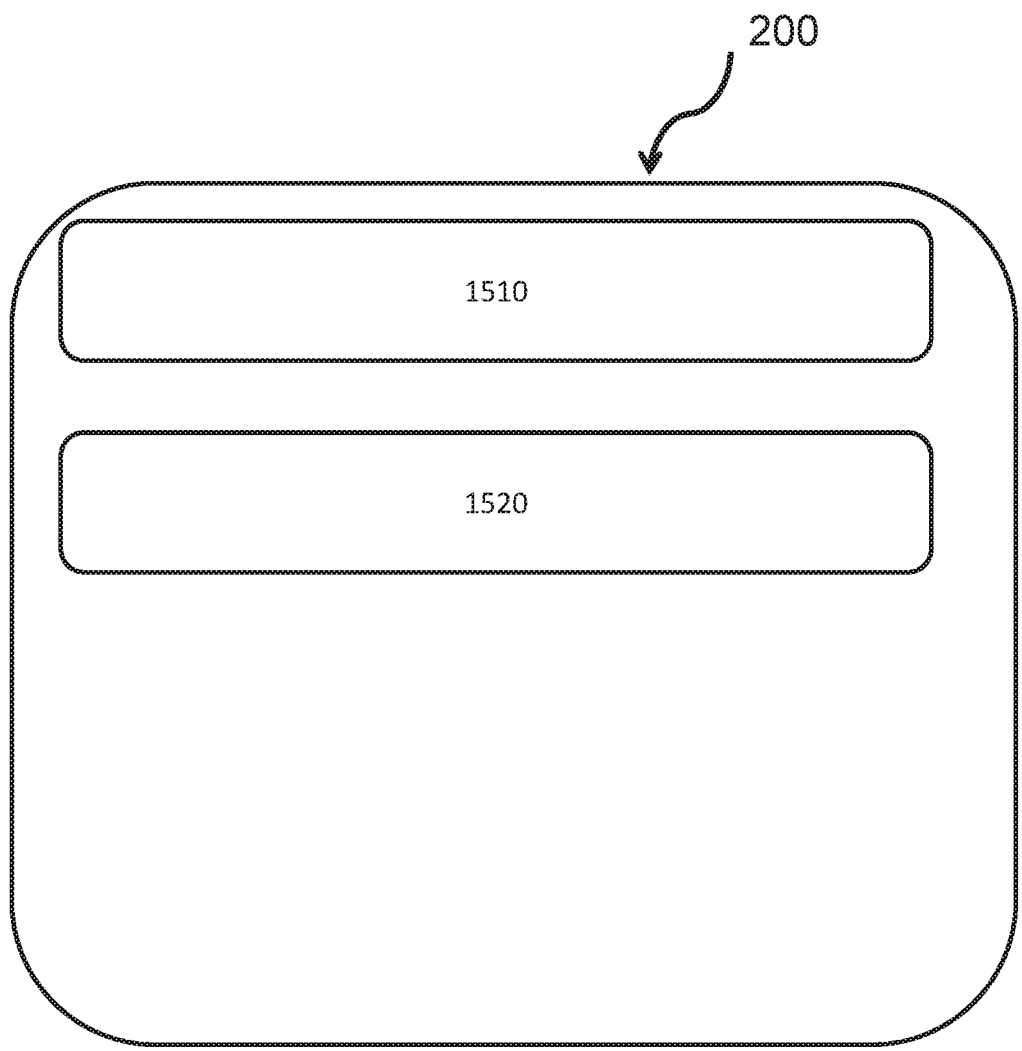
FIG. 15 shows a network node according to one or more embodiments of the present disclosure.

FIG. 15 shows a network node according to the present invention. The network node interacting with a wireless device, the network node comprising:

a second generating module 1510 for generating a spreading configuration, comprising at least one configured spreading sequence, a second receiving module 1520 for receiving modulation symbols based on the spreading configuration, the modulation symbols being demodulated to uplink control information, UCI, associated to at least one PUCCH.

Moreover, it is realized by the skilled person that the wireless device 100 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

The processor, e.g. of the present wireless device 100, comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

Embodiment 1 A method for a wireless device, the method comprising:
obtaining 710 uplink control information, UCI, comprising a number of UCI bits,
mapping 720 the UCI bits to a set of modulation symbols,
obtaining 730 a physical resource block, PRB, configuration, wherein the PRB configuration is at least indicative of one or more allocated PRBs available for transmission of the modulation symbols,
mapping 740 the modulation symbols to the PRB configuration.

Embodiment 2 The method according to embodiment 1, further comprising performing any of a selection of the steps encoding, interleaving, and CRC attachment of the UCI bits.

Embodiment 3 The method according to embodiments 1-2, further comprising
selecting a PRB set from the allocated PRBs, and
allocating subcarriers comprised in the PRB set for transmission of the modulation symbols.

Embodiment 4 The method according to embodiment 3, wherein the PRB set comprises a single PRB.

Embodiment 5 The method according to embodiment 3, wherein the PRB set comprises a plurality of PRBs.

Embodiment 6 The method according to any of embodiments 3-5, wherein the method further comprises:
determining that the number of UCI bits is less than or equal to a number of payload bits offered by the PRB set before performing the step of allocating the subcarriers.

Embodiment 7 The method according to any of the preceding embodiments, wherein the PRB configuration is further indicative of allocated subcarriers comprised in the one or more allocated PRBs, wherein the method further comprises:
transmit the modulation symbols using the allocated subcarriers.

Embodiment 8 The method according to any of embodiments 3-7, wherein the subcarriers are contiguously allocated or allocated according to a comb pattern.

Embodiment 9 The method according to any of the preceding embodiments, further comprising transform preceding the set of modulation symbols based on a number of used subcarriers or based on a number of allocated subcarriers.

Embodiment 10. The method according to any of the preceding embodiments, wherein the allocated PRBs available for transmission of the modulation symbols are further allocated for transmission of demodulation reference signals, DMRS.

Embodiment 11 The method according to embodiment 10, wherein subcarriers comprised in the allocated PRBs, used for transmission of the modulation symbols, and additional subcarriers, comprised in the allocated PRBs, are used for transmission of demodulation reference signals, DMRS.

Embodiment 12. The method according to any of embodiments 3-11, further comprising repeating the step of mapping the modulation symbols to the PRB configuration, wherein the subcarriers differ between different symbols.

Embodiment 13 A method for a network node, the method comprising:
generating 810 a physical resource block, PRB, configuration, wherein the PRB configuration is at least indicative of one or more allocated PRBs to be used by at least one wireless device for transmission of modulation symbols,
receiving 820 modulation symbols based on the PRB configuration, the modulation symbols being demodulated to uplink control information, UCI, associated to at least one PUCCH.

Embodiment 14 The method according to embodiment 13, wherein the modulation symbols are mapped to a plurality of uplink control information, UCI, each UCI being associated to a different PUCCH and being received on different sets of subcarriers of the one or more allocated PRBs.

Embodiment 15 The method according to embodiment 14, wherein the subcarriers on which each UCI are received are contiguously allocated or allocated according to a comb pattern.

Embodiment 16 The method according to any of embodiments 13-15, wherein receiving the modulation symbols is performed on subcarriers comprised in a PRB set selected from the allocated PRBs.

Embodiment 17, The method according to embodiment 16, wherein the PRB set comprises a single PRB.

Embodiment 18, The method according to embodiment 16, wherein the PRB set comprises a plurality of PRBs.

Embodiment 19. A method for a wireless device, the method comprising:
obtaining 910 uplink control information, UCI, comprising a number of UCI bits,
mapping 920 the UCI bits to a set of modulation symbols,
obtaining a spreading configuration, comprising at least one configured spreading sequence.
spreading 930 the modulation symbols using the least one configured spreading sequence.

Embodiment 20 The method according to embodiment 19, further comprising performing any of a selection of the steps encoding, interleaving, and CRC attachment of the UCI bits.

Embodiment 21 The method according to any of the preceding embodiments, further comprising obtaining a physical resource block, PRB, configuration, wherein the PRB configuration is at least indicative of one or more allocated PRBs available for transmission of the modulation symbols, and wherein spreading the modulation symbols is performed over the one or more allocated PRBs.

Embodiment 22. The method according to any of the preceding embodiments, further comprising:
selecting a subcarrier set from the allocated PRBs, and
spreading the modulation symbols over the selected subcarriers.

Embodiment 23 The method according to any of the preceding embodiments, further comprising transform precoding the set of modulation symbols, wherein
the precoding matrix size is based on a number of used subcarriers or based on a number of allocated subcarriers comprised in the PRB configuration, or wherein
the precoding matrix size is based on a number of configured spreading sequences comprised in the spreading configuration.

Embodiment 24. The method according to any of embodiments 21-23,
wherein the allocated PRBs available for transmission of the modulation symbols are further allocated for transmission of demodulation reference signals, DMRS, or
wherein subcarriers comprised in the allocated PRBs, used for transmission of the modulation symbols, and additional subcarriers, comprised in the allocated PRBs, are used for transmission of demodulation reference signals, DMRS.

Embodiment 25 The method according to any of the preceding embodiments, wherein the spreading configuration comprises a plurality of configured spreading sequences, and the method further comprises selecting one configured spreading sequence from the set of configured spreading sequences for spreading the set of modulation symbols.

Embodiment 26 The method according to embodiment 25, wherein the selection of one configured spreading sequence is performed based on control information received from a gNB or based on an UCI size indicative of the number of UCI bits Embodiment 27. The method according to any of the preceding embodiments, where the at least one configured spreading sequence used for spreading the modulation symbols varies across symbols.

Embodiment 28 The method 1000 according to any of the preceding embodiments, wherein the method further comprises performing a transform of the spread modulation symbols.

Embodiment 29 A method for a network node, the method comprising:
generating 1010 a spreading configuration, comprising at least one configured spreading sequence,
receiving 1020 modulation symbols based on the spreading configuration, the modulation symbols being demodulated to uplink control information, UCI, associated to at least one PUCCH.

Embodiment 30 The method according to embodiment 29, wherein the modulation symbols are demodulated to a plurality of uplink control information, UCI, each UCI being associated to a different PUCCH and being received using a different spreading sequence.

Embodiment 31 The method according to any of the preceding embodiments, further comprising generating a physical resource block, PRB, configuration, wherein the PRB configuration is at least indicative of one or more allocated PRBs available for transmission of the modulation symbols, and wherein receiving the modulation symbols is performed over the one or more allocated PRBs.

Embodiment 32. A wireless node configured for communication in a wireless communication network, comprising circuitry comprising:
a processor, and
a memory, said memory containing instructions executable by said processor, whereby said first wireless device is operative to perform the method of any of embodiments 1-12 or 19-28.

Embodiment 33. A computer program comprising computer-executable instructions for causing a wireless device, when the computer-executable instructions are executed on a processing unit comprised in the wireless node, to perform any of the method steps of any of embodiments 1-12 or 19-28.

Embodiment 34. A computer program product comprising a computer-readable storage medium, the computer-readable storage medium having the computer program according to embodiment 33 embodied therein.

Embodiment 35 A network node configured for communication in a wireless communication network, comprising circuitry comprising:
a processor, and
a memory, said memory containing instructions executable by said processor, whereby said first wireless device is operative to perform the method of any of embodiments 13-18 or 29-31.

Embodiment 36. A computer program comprising computer-executable instructions for causing a network node, when the computer-executable instructions are executed on a processing unit comprised in the wireless device, to perform any of the method steps of any of embodiments 13-18 or 29-31.

Embodiment 37. A computer program product comprising a computer-readable storage medium, the computer-readable storage medium having the computer program according to embodiment 36 embodied therein.

Embodiment 38 A wireless device, the wireless device interacting with a network node, the wireless device comprising:
a first obtaining module for obtaining uplink control information, UCI, comprising a number of UCI bits,
a first mapping module for mapping the UCI bits to a set of modulation symbols,
a second obtaining module for obtaining a physical resource block, PRB, configuration, wherein the PRB configuration is at least indicative of one or more allocated PRBs available for transmission of the modulation symbols,
a second mapping module for mapping the modulation symbols to the PRB configuration.

Embodiment 39 A network node, the network node interacting with a wireless device, the network node comprising:
a first generating module for generating a physical resource block, PRB, configuration, wherein the PRB configuration is at least indicative of one or more allocated PRBs to be used by at least one wireless device for transmission of modulation symbols,
a first receiving module for receiving modulation symbols based on the PRB configuration, the modulation symbols being demodulated to uplink control information, UCI, associated to at least one PUCCH.

Embodiment 40 A wireless device, the wireless device interacting with a network node, the wireless device comprising:
a third obtaining module for obtaining uplink control information, UCI, comprising a number of UCI bits,
a third mapping module for mapping the UCI bits to a set of modulation symbols,
a fourth obtaining module for obtaining a spreading configuration, comprising at least one configured spreading sequence.
a spreading module for spreading the modulation symbols using the least one configured spreading sequence.

Embodiment 41 A network node, the network node interacting with a wireless device, the network node comprising:
a generating module for generating a spreading configuration, comprising at least one configured spreading sequence,
a second module for receiving modulation symbols based on the spreading configuration, the modulation symbols being demodulated to uplink control information, UCI, associated to at least one PUCCH.

The invention claimed is:

1. A method for use in a wireless device in a wireless communication system for transmitting uplink control information (UCI), the method comprising:
obtaining UCI comprising a number of UCI bits;
mapping the UCI bits to a set of modulation symbols;
obtaining a resource configuration, wherein the resource configuration is at least indicative of:
one or more allocated resources available for transmission of the modulation symbols, and
a subcarrier allocation pattern defining allowed use of subcarriers within the one or more allocated resources,
wherein, for at least one symbol in the one or more allocated resources, the subcarrier allocation pattern defines allowed use of at least some contiguous subcarriers;

mapping the modulation symbols to the resource configuration; and transmitting the modulation symbols using the allocated subcarriers;

wherein the step of mapping the modulation symbols further comprises selecting a resource set from the allocated resources; and allocating subcarriers comprised in the resource set for transmission of the modulation symbols; and wherein the method further comprises:

determining that the number of UCI bits is less than or equal to a number of payload bits offered by the resource set before performing the step of allocating the subcarriers; and adapting a code rate or a modulation order to accommodate additional payload bits.

2. The method of claim 1, wherein the resource set comprises a single Physical Resource Block (PRB).

3. The method of claim 1, wherein the resource set comprises a plurality of PRBs.

4. The method of claim 1, wherein the subcarrier allocation pattern allows use of subcarriers within the one or more allocated resources that are contiguously allocated or subcarriers within the one or more allocated resources that are allocated according to a comb pattern.

5. The method of claim 1, further comprising repeating the step of mapping the modulation symbols to the resource configuration, wherein the allowed subcarriers differ between different modulation symbols.

6. The method of claim 1, wherein the allocated resources available for transmission of the modulation symbols are further allocated for transmission of demodulation reference signals (DMRS).

7. The method of claim 6, wherein subcarriers comprised in the allocated resources, used for transmission of the modulation symbols, and additional subcarriers further comprised in the allocated resources, are used for transmission of demodulation reference signals (DMRS).

8. The method of claim 6, wherein the subcarrier allocation pattern defines that the resources allocated for transmission of DMRS include all subcarriers comprised in the one or more allocated resources; or wherein the subcarrier allocation pattern defines that the resources allocated for transmission of DMRS include a subset of subcarriers, comprised in the one or more allocated resources, wherein the subset of subcarriers are contiguously allocated or allocated according to a comb pattern.

9. The method of claim 1, further comprising performing any of a selection of the steps encoding, scrambling, interleaving, and CRC attachment of the UCI bits.

10. The method of claim 1, further comprising transform precoding the set of modulation symbols based on a number of used subcarriers or based on a number of allocated subcarriers.

11. A wireless device configured for communication in a wireless communication network, the wireless device comprising:

a processor; and a memory operatively coupled to said processor, said memory containing instructions executable by said processor, whereby said wireless device is operative to perform the method of claim 1.

12. A non-transitory computer-readable medium comprising, stored thereupon, computer program code comprising computer-executable instructions configured so as to cause a wireless device, when the computer-executable instructions are executed on a processing unit comprised in the wireless device, to perform the steps of claim 1.

* * * * *